(12) United States Patent
Lewis et al.

(10) Patent No.: US 7,603,709 B2
(45) Date of Patent: Oct. 13, 2009

(54) METHOD AND APPARATUS FOR PREDICTING AND PREVENTING ATTACKS IN COMMUNICATIONS NETWORKS

(75) Inventors: Lundy M. Lewis, Mason, NH (US);
Joao B. D. Cabrera, Woburn, MA (US);
Raman K. Mehra, Lexington, MA (US)

(73) Assignee: Computer Associates Think, Inc., Islandia, NY (US)

( * ) Notice: Subject to any disclaimer, the term of this patent is extended or adjusted under 35 U.S.C. 154(b) by 1246 days.

(21) Appl. No.: 10/138,836

(22) Filed: May 3, 2002

(65) Prior Publication Data

US 2003/0110396 A1    Jun. 12, 2003

Related U.S. Application Data

(66) Substitute for application No. 60/288,530, filed on May 3, 2001.

(51) Int. Cl.
*G06F 12/00* (2006.01)
*H04L 29/06* (2006.01)

(52) U.S. Cl. ....................................................... 726/23
(58) Field of Classification Search .................. 726/22, 726/23
See application file for complete search history.

(56) References Cited

U.S. PATENT DOCUMENTS

| | | | | |
|---|---|---|---|---|
| 6,370,648 | B1* | 4/2002 | Diep | 726/22 |
| 6,647,400 | B1* | 11/2003 | Moran | 726/23 |
| 6,839,850 | B1* | 1/2005 | Campbell et al. | 726/23 |
| 6,886,102 | B1* | 4/2005 | Lyle | 726/23 |
| 7,203,962 | B1* | 4/2007 | Moran | 726/23 |
| 7,240,368 | B1* | 7/2007 | Roesch et al. | 726/23 |
| 2002/0120853 | A1* | 8/2002 | Tyree | 713/188 |
| 2002/0166063 | A1* | 11/2002 | Lachman et al. | 713/188 |
| 2003/0051026 | A1* | 3/2003 | Carter et al. | 709/224 |

(Continued)

OTHER PUBLICATIONS

K. Boudaoud, H. Labiod, R. Boutaba, and Z. Guessoum, "Network Security Management with Intelligent Agents," *Proceedings of NOMS*, 2000, IEEE Publishing.

(Continued)

*Primary Examiner*—Gilberto Barron, Jr.
*Assistant Examiner*—Abdulhakim Nobahar
(74) *Attorney, Agent, or Firm*—Pillsbury Winthrop Shaw Pittman LLP

(57) ABSTRACT

In one embodiment of a method and apparatus for predicting and preventing network attacks, data is collected from network devices during an attack. The collected data is analyzed to identify specific temporal precursors of the attack. The future network activity is then monitored for the presence of the identified temporal attack precursors. When the presence of a precursor is detected, appropriate protective action is taken. Preferably, all steps in this process occur automatically. In the preferred embodiment, the process is performed under the control of one or more network or element management systems. The possible network domain includes data, voice, and video networks and multiple, interconnected network technologies. In one embodiment, triggers responsive to the presence of the identified precursors are placed into a network or element management system. The preferred embodiment of the invention utilizes machine-learning algorithms for discovering precursors of attacks, but any suitable algorithm may be used. The invention may be used in "attack autopsy" mode only, monitoring mode only, or both. Among other uses, the invention allows integration of Intrusion Detection Systems with Network Management Systems.

14 Claims, 10 Drawing Sheets

U.S. PATENT DOCUMENTS

2007/0157315 A1* 7/2007 Moran .................... 726/23

OTHER PUBLICATIONS

P. J. Criscuolo, "Distributed Denial of Service—Trin00, Tribe Flood Network, Tribe Flood Network 2000, and Stacheldraht," Technical Report CIAC-2319, Feb. 2000, Department of Energy—CIAC (Computer Incident Advisory Capability).

Z. Fu, H. Huang, T. Wu, S. Wu, F. Gong, C. Xu, and I. Baldine, "ISCP: Design and Implementation of an Inter-Domain Security Management Agent (SMA) Coordination Protocol," *Proceedings of NOMS*, 2000, IEEE Publishing.

C.W.J. Granger, "Investigating causal relations by econometric models and crossspectral methods," *Econometrica*, 1969, 424-438, vol. 43.

J. Hamilton, *Time Series Analysis*, 1994, Princeton University Press.

K. Kendall, "A database of computer attacks for the evaluation of intrusion detection systems," Master's thesis, Jun. 1999, Massachusetts Institute of Technology.

W. Lee, S. J. Stolfo, and K. W. Mok, A data mining framework for building intrusion detection models, *Proceedings of the IEEE Symposium on Security and Privacy*, 1999.

R. K. Mehra, K. M. Nagpal, and R. K. Prasanth, "Deterministic-stochastic realization algorithms (DSRA)" Technical report, 1997, Scientific Systems Company, Inc.

B. Mukherjee, L. T. Heberlein, and K. N. Levitt, "Network intrusion detection" *IEEE Network*, May 1994, pp. 26-41, vol. 8(3).

P. Van Overschee and B. De Moor, *Subspace Identification for Linear Systems*, 1996, Kluwer Academic Publishers, Norwell, MA.

Science and Technology Section, Internet Security—Anatomy of an Attack, *The Economist*, Feb. 19, 2000, pp. 80-81.

W. R. Stevens, *TCP/IP Illustrated, vol. 1: The Protocols*, 1994, Addison-Wesley.

M. Subramanian, *Network Management—Principles and Practice*, 2000, Addison-Wesley.

M. Thottan and C. Ji, "Proactive anomaly detection using distributed agents," *IEEE Network*, Sep. 1998, pp. 21-27.

R. Agrawal, T. Imielinski, and A. Swami, "Database Mining: A Performance Perspective, " *IEEE Transactions on Knowledge and Data Engineering*, Dec. 1993 pp. 914-925, vol. 5(6).

J. Allen, A. Christie, W. Fithen, J. McHugh, J. Pickel, and E. Stoner, "State of the Practice of Intrusion Detection Technologies," Technical Report CMU/SEI-99-TR-028, Jan. 2000, Carnegie Mellon University—Software Engineering Institute.

E. Amoroso, *Intrusion Detection: An Introduction to Internet Surveillance, Correlation, Traps, Trace Back and Response*, First edition, 1999, Intrusion.Net Books.

S. Axelsson, "The base-rate fallacy and its implications for the difficulty of intrusion detection," *Proceedings of the 6th ACM Conference on Computer and Communications Security*, Nov. 1999, Singapore.

G. Casella and R. L. Berger, *Statistical Inference*, 1990, Duxbury Press, Belmont, CA.

G. Das, K.-I. Lin, H. Mannila, G. Renganathan, and P. Smyth, "Rule discovery from time series," *Proceedings of the 4th International Conference on Knowledge Discovery and Data Mining*, 1998, pp. 16-22.

D. Denning, "An intrusion detection model," *IEEE Transactions on Software Engineering*, Feb. 1987, pp. 222-232, vol. 13(2).

S. Kent, "On the trail of intrusions into information systems," *IEEE Spectrum*, pp. 52-56, Dec. 2000.

H. Mannila, H. Toivonen, and A. I. Verkamo, "Discovery of frequent episodes in event sequences," *Data Mining and Knowledge Discovery*, 1997, pp. 259-289, vol. 1(3).

S. Northcutt, *Network Intrusion Detection—An Analyst's Handbook*, 1999, New Riders Publishing.

D. Schnackenberg, K. Djahandari, and D. Sterne, "Infrastructure for intrusion detection and response," *Proceedings of DARPA Information Survivability Conference and Exposition*, Jan. 2000, Hilton Head Island, SC.

F. B. Schneider, ed., *Trust in Cyberspace*, 1998, National Academy Press.

B. Schneier, *Secrets and Lies: Digital Security in a Networked World*, 2000, Wiley.

H. Chang, R. Narayan, S. Wu, B. Vetter, X. Wang, M. Brown, J. Yuill, C. Sarger, J. Jou, and F. Gong, "Decid UouS: Decentralized Source Identification for Network-Based Intrusions," *Integrated Network Management*, 1999, vol. 6, IEEE Publishing.

J. Geweke, R. Meeses, and W. Dent, "Comparing alternative tests of causality in temporal systems—analytic results and experimental evidence," *Journal of Econometrics*, 1983, pp. 161-194, vol. 21.

J. E. Gaffney, Jr. and J. W. Ulvila, "Evaluation of Intrusion Detectors: a Decision Theory Approach," *Proceedings of the IEEE Symposium on Security and Privacy*, May 2001.

Allen, et al. "State of the Practice of Intrusion Detection Technologies." Technical Report CMU/SEI-99-TR-028.

Amoroso, Edward. *Intrusion Detection: An Introduction to Internet Surveillance, Correlation, Trace Back, Traps, and Response*. First Edition, Intrusion.Net Books, 1999, pp. 1-218.

Boudaoud, et al. "Network Security Management with Intelligent Agents." *Proceedings of NOMS*, IEEE Publishing, 2000, pp. 579-592.

Chang, et al. DecIdUouS: Decentralized Source Identification for Network-Based Intrusions. Integrated Network Management, IEEE Publishing, 1999, vol. 6, pp. 701-714.

Denning, D. "An Intrusion-Detection Model." IEEE Transactions on Software Engineering, Feb. 1987, vol. SE-13, No. 2, pp. 222-232.

Huang, et al. ISCP: Design and Implementation of An Inter-Domain Security Management Agent (SMA) Coordination Protocol. *Proceedings of NOMS*, 2000, IEEE Publishing, pp. 565-578.

Mukherjee, et al. "Network Intrusion Dection: Intrusion Detection is a new, retrofit approach for providing a sense of security in existing computers and data networks, while allowing them to operate in their current "open" mode." IEEE Network, May 1994, vol. 8(3)26-41.

Schnackenberg, et al. "Infrastructure for Intrusion Detection and Response." *Proceedings of DARPA Information Survivability Conference and Exposition*. Jan. 2000, Hilton Head Island, SC, pp. 3-11.

M. Evans, N. Hastings, and B. Peacock, *Statistical Distributions*, Second Edition, 1993, John Wiley and Sons, Inc., New York.

Trust in Cyberspace, National Academy Press, 1999.

* cited by examiner (a) ipInReceives (b) icmpInMsgs (c) icmpInEchos (d) icmpInEchoReps (e) icmpOutMsgs (f) icmpOutDestUnreachs (a) ipInReceives (b) icmpInMsgs (c) icmpInEchos (d) icmpInEchoReps (e) icmpOutMsgs (f) icmpOutDestUnreachs (a) ipInReceives (b) icmpInMsgs (c) icmpInEchos (d) icmpInEchoReps (e) icmpOutMsgs (f) icmpOutDestUnreachs

METHOD AND APPARATUS FOR PREDICTING AND PREVENTING ATTACKS IN COMMUNICATIONS NETWORKS

RELATED APPLICATIONS

This application claims priority to U.S. Provisional Application Ser. No. 60/288,530, filed May 3, 2001.

GOVERNMENT RIGHTS STATEMENT

This invention was made with Government support under Contract F30602-00-C-0126 awarded by the Air Force. The Government has certain rights in this invention.

FIELD OF THE INVENTION

This invention relates to network security and, in particular, to prediction of, and prevention of damage from, attacks on communications networks supporting video, voice, and data services.

BACKGROUND

With the increasing dependence of nearly all aspects of modern life on network-based communications, network security has become of primary concern to businesses, individuals, and governments. Security Management is therefore of growing interest for industry and research. There are at least four general methods of Security Management, including: (i) Scanning, in which knowledge-based software tools look for security loopholes in a network; (ii) On-line monitoring, in which network management tools are triggered by certain suspicious events; (iii) Data encryption and secure passwords; and (iv) Firewalls. The combination of several disparate mechanisms into a common security architecture constitutes the "Defense-in-Depth" security management approach that is currently in vogue.

The failure of authenticators and other protection mechanisms to provide an adequate defense against attacks on information systems, as well as the resulting mistrust of these mechanisms, is among the most important driving forces behind the development of Intrusion Detection Systems (IDSs) in the past twenty years. However, current IDSs are not preventive security measures, and they are therefore most often used in conjunction with various other protection mechanisms, such as firewalls, smart cards and virtual private networks. Unfortunately, one of the current gaps in the development of IDSs relates to the inability of an IDS to interact with other networking elements.

For example, SNMP-based Network Management Systems are well known, and viable in industry. In the early 1990s, these systems were designed following the classic FCAPS (Fault, Configuration, Accounting, Performance and Security) model defined by the International Standard Organization. According to the FCAPS model, Security Management protects both the network and network management system against intentional or accidental abuse, unauthorized access, and communication loss. Under this definition, the deployment of IDSs belongs to the realm of Security Management, and it therefore comes a surprise that IDSs have not been designed to take advantage of the monitoring and alarming infrastructure provided by commercial NMSs.

In fact, little or no integration exists today between Intrusion Detection Systems (IDSs) and SNMP-based Network Management Systems (NMSs), in spite of the extensive monitoring and alarming capabilities offered by commercial NMSs. This difficulty is mainly associated with the semantic disparity between the distinct data sources used by the two systems: packet traffic and audit records for IDSs versus SNMP MIB variables for NMSs. In general, IDSs observe and understand the environment in terms of either audit records collected from hosts (Host-based IDSs) or raw packet traffic collected from the communication medium (Network-based IDSs). SNMP-based NMSs, on the other hand, observe and understand the environment in terms of MIB variables in order to set traps and perform polling. The fact that some IDSs are able to communicate with Network Management Systems via SNMP does not alleviate this problem; the key issue is appropriate semantic interaction among disparate systems rather than the control of individual IDSs.

The rules produced by current IDSs are passive, in the sense that a security violation has to occur in order to be detected. If detection could happen early enough, it might be possible to minimize, or even eliminate, the deleterious effects of the security violation. Unfortunately, early detection in current IDSs is usually the result of incidental circumstances, not of systematic design. On the other hand, almost all security violations encountered in practice evolve in multiple stages. Some of the preliminary stages may not be destructive per se, but merely preparatory steps in the Attack Scenario. If indicators of these preparatory steps, or attack precursors, could be detected and immediate action taken, the resulting attack would be prevented. This capability is called Proactive, or Anticipatory Intrusion Detection, in order to distinguish it from the passive detection enabled by current IDSs. If successful, Proactive Intrusion Detection could be an invaluable enabling capability for Response, since enough time would be available to respond to the destructive phase of the attack, ideally preventing it from ever taking place.

While there are some methods for knowing when a network or network device is currently undergoing or has undergone an attack, there have in general been no ways to know before the fact that a network is about to be attacked, except possibly by simple human guesswork. It would obviously be advantageous to businesses, academic institutions, and governmental agencies if it were possible to consistently predict when an attack is going to occur, even if the time lapse from prediction to attack were only a matter of seconds, in order that action could be taken to prevent damage to the network. What has been needed, therefore, is a way to automatically predict an imminent attack on a communications network or device and, preferably, a way to automatically take protective action after an attack has been predicted.

OBJECTS OF THE INVENTION

Accordingly, an object of the present invention is to provide a method and apparatus by which to protect the integrity of data, voice, and video networks and devices.

A particular object of the invention is to provide a way to predict imminent attacks on communications networks and devices.

A further particular object of the present invention is to provide a way to identify specific temporal precursors of different types of attacks on communications networks and devices.

Another object of the invention is to provide a method and apparatus by which to monitor a communications network for the presence of known temporal precursors of network attacks and to take appropriate protective action if such precursors are present.

A further particular object of the present invention is to allow integration of Intrusion Detection Systems with Network Management Systems.

SUMMARY

The present invention is a method and apparatus for predicting and preventing imminent network attacks by identifying temporal precursors of such attacks, monitoring future network activity for such precursors, and taking protective action when precursors are detected, thus allowing an attack to be foiled before any damage is done. Preferably, all steps in this process occur automatically. The contemplated network domain includes data, voice, and video networks, as well as multiple, interconnected network technologies.

The present invention has two modes: (i) proactive ("monitoring"), and (ii) reactive ("attack autopsy"). The invention may be used in "attack autopsy" mode only, "monitoring" mode only, or both. While the present invention was originally conceived as a methodology for utilizing the capabilities of Network Management Systems for the early detection of various kinds of attacks on communications networks and devices, the resultant methodology can be employed with other types of technologies and the present invention is therefore not limited to the application of one or more Network Management Systems.

In one embodiment of the method of the present invention, data is collected during a network attack in any manner known in the art. The collected data is analyzed to identify specific temporal precursors of the attack. The future network activity is then monitored for the presence of the precursors. When the presence of a precursor is detected, appropriate protective action is taken. If one or more network or element management systems are employed, triggers responsive to the presence of the identified precursors may be placed into one or more of the management systems, which then monitor the network and/or network devices for the presence of the precursors.

In one embodiment of the apparatus of the present invention, one or more data collection means are utilized to collect data values during an attack on a communications network. The collected data is then processed by a data analyzing system, which identifies specific precursor events of the network attack. A monitor continuously checks for the presence of the identified precursors. When the monitor detects the presence of a precursor, appropriate action is taken. One or more triggers responsive to the detection of the identified precursors may be incorporated into the network or network devices. In this case, when the monitor detects the presence of a precursor, one or more of the triggers signal the action-taking means to take appropriate protective action.

Any suitable algorithm may be used for discovering precursors of attacks including, but not limited to, statistics-based machine learning algorithms, neural networks and AI-based algorithms. In a typical example, the algorithm utilized will compare the data values collected during the attack state to data values collected during normal network operation, in order to identify those variables that manifest aberrant values or activity levels just prior to the onset of the attack.

In a preferred embodiment, the monitoring and triggering functions reside in one or more network management or element management systems, and the protective actions are therefore automatically undertaken by the management system. To implement the methodology of the present invention, rules (i.e. policies) may be implemented in one or more distributed management systems. Domain-specific agents may also collaborate in order to determine the likelihood of an impending attack.

An example embodiment of the invention focuses on detecting and preventing damage from a particular kind of attack, a Distributed Denial of Service (DDoS) Attack. The application of the invention is not limited to DDoS attacks, however; the invention may used to prevent any type of attack on a communications network or device. While the example embodiment utilizes the values of SNMP MIB variables as the domain of data from which to discover precursor events, data from any other protocol known in the art may be used. In addition, other kinds of events may be exploited for use in the present invention, including, but not limited to, events that issue from end-station and applications management agents, including, but not limited to, log-on traces, keystroke traces, and records of computer processes.

DETAILED DESCRIPTION

Figure 1:
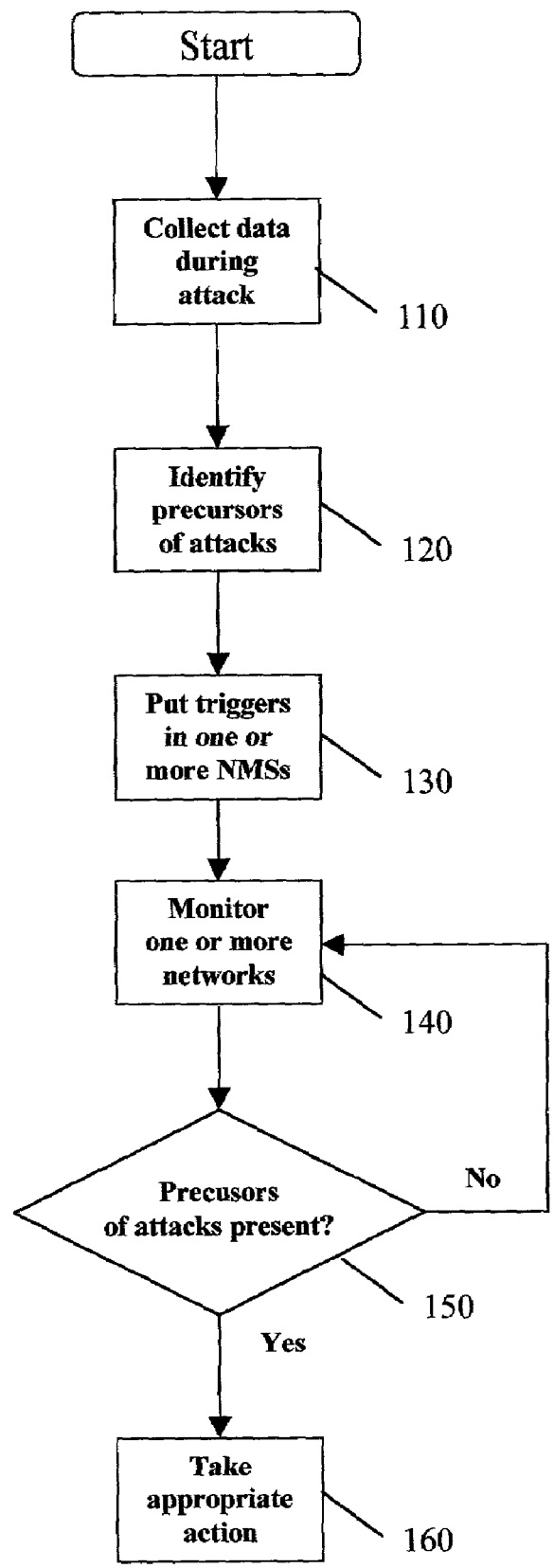
FIG. 1 illustrates the steps of an embodiment of the method for predicting and preventing attacks in communications networks according to the present invention.

The present invention is a method and apparatus for predicting and preventing imminent network attacks by identifying temporal precursors of such attacks, monitoring future network activity for such precursors, and taking protective action when precursors are detected. Because the present invention engenders identification of, and monitoring for, temporal precursors of various types of attacks, an attack may be foiled before any damage is done. In the preferred embodiment, all steps in this process occur automatically; however, the present invention also covers embodiments where one or more of the steps or functions is initiated or performed manually. The contemplated network domain includes data, voice, and video networks, as well as multiple, interconnected network technologies.

The present invention has two modes: (i) proactive, i.e. once prediction rules have been inferred, to set up corresponding rules in a network management system or other monitoring device, and (ii) reactive, i.e. in a forensic/autopsy-type operation, wherein a dataset obtained during an attack is sent to a laboratory and the methods of the invention are applied to the dataset. The invention may be used in "attack autopsy" mode only, monitoring mode only, or both.

The present invention belongs to the on-line monitoring category of Security Management, and is therefore closely related to the area of Intrusion Detection. The original experimental objective was to find a way to utilize a Network Management System for Intrusion Detection. Therefore, the present invention was originally conceived as a methodology for utilizing the capabilities of Network Management Systems for the early detection of various kinds of attacks on communications networks and devices. The resultant methodology can, however, be employed with other types of technologies and the present invention is therefore not limited to the application of one or more Network Management Systems.

As previously discussed, little or no integration exists today between Intrusion Detection Systems (IDSs) and SNMP-based Network Management Systems (NMSs). This difficulty is mainly associated with the distinct data sources used by the two systems: packet traffic and audit records for IDSs versus SNMP Management Information Base (MIB) variables for NMSs. Clearly, if IDSs can be built using variables that can be understood by NMSs, such as the MIB variables, then the infrastructure already provided by commercially available NMSs might be used to ease the integration of IDSs into the fabric of Security Management. MIB variables also supply one more source of data regarding the network infrastructure and may therefore provide information that would not be available in audit records and packet traffic. Hence, "NMS-friendly" IDSs may allow the detection of security violations that may not have been detected otherwise. Thus, one specific objective of the present invention is to allow integration of IDSs with NMSs by constructing IDSs based on MIB variables or on other data formats that can be easily integrated with NMSs, such as SNMP traps and alarm outputs.

As previously discussed, almost all security violations encountered in practice evolve in multiple stages, and some of the preliminary stages may not be destructive per se but rather merely preparatory steps in the Attack Scenario. If indicators of these preparatory steps, or "attack precursors", can be detected and immediate action is then taken, the resulting attack may be prevented. This capability is called Proactive, or Anticipatory, Intrusion Detection, in order to distinguish it from the passive detection enabled by current IDSs. If successful, Proactive Intrusion Detection is an invaluable enabling capability for Response, since enough time is then available to respond to the destructive phase of the attack, ideally preventing it to ever take place. The present invention demonstrates that MIB variables can be used not only to characterize security violations, but also to characterize precursors to security violations. This means that the present invention may be utilized for Proactive Intrusion Detection, which in turn allows Proactive Intrusion Detection to be integrated with Security Management.

In the context of Security Management, a proactive, or anticipatory, action may be viewed as a procedure consisting of two elements: (i) Detection of security violations before network operation is compromised; and (ii) Response to the attempted security violation. Embodiments of the present invention may encompass the detection element, the response element, or both. In particular, it is expected that a network management system used for the detection element might also then be employed to coordinate the response to the attack.

As a general proposition, a Proactive, or Anticipatory, Intrusion Detector is based on a scheme that issues alarms based on Temporal Rules. In contrast with Passive Intrusion Detectors, Proactive Intrusion Detectors are characterized by:

(1) Temporal rules: The antecedent and the consequent items of the detection rule occur at distinct instants of time; the antecedent precedes the consequent. The design of a Proactive IDS is therefore a problem in Time Series Analysis.

(2) Report incoming danger: If the antecedent is true, a security violation occurs within a certain amount of time.

The extraction of Temporal Rules is performed off-line. Large datasets recorded from the multiple domains of the Information System are analyzed in search of rules relating security violations at the Target to variables that may contain attack precursors. These datasets include Attack Runs, in which Attacks were known to be present, and Normal, or Attack-Free Runs, used to construct profiles of normal operation. The Temporal Correlation Engine is presented with the evolution of the network states and the history of security violations. The Engine extracts Temporal Rules, relating network states that precede security violations.

The design of a Proactive Intrusion Detector generally follows four main steps:

Step 1: Identifying the variables at the targets that characterize the security violation. This is performed by using domain knowledge about the type of attack or by data-based methods. This step essentially corresponds to the design of a Passive IDS.

Step 2: Identifying key variables containing attack precursors. This is effected through Statistical Causality Tests that measure the relative causality strengths between a number of candidate variables and the variables determined in Step 1.

Step 3: Identifying the events most likely to be the ones preceding the security violation, the "precursor events." This is performed by comparing the evolution of the variables determined in Step 2 with their normal profile. Deviations from the normal profile characterize the precursors being sought.

Step 4: Verifying that the precursor events extracted in Step 3 are consistently followed by the security violations characterized by the variables identified in Step 1.

In an embodiment of a method and apparatus for predicting and preventing imminent network attacks according to the present invention, data is collected from a communications network during a real or simulated network attack. Data may be collected in any manner known in the art from any aspect of the communications network including, but not limited to, devices, applications, computer or other systems, and traffic media and/or airwaves. In a preferred embodiment, the data is collected by one or more network or element management systems, but any other method or methods of collecting such data known in the art may be employed. While the example embodiment described below utilizes the values of Simple Network Management Protocol (SNMP) MIB variables as the domain of data from which to discover precursor events, data from any other protocol known in the art may be used, including, but not limited to, Remote Monitoring (RMON) data, CMIP-based data, and data based on proprietary protocols.

The collected data is then analyzed in order to identify specific precursors of the attack. Any suitable machine-learning algorithm may be used for discovering precursors of attacks. The invention is not limited to statistics-based machine learning algorithms; other algorithms are contemplated, including, but not limited to, neural networks and AI-based algorithms. In a typical example, the algorithm utilized will compare the data values collected during the attack state to data values collected during normal network operation, in order to identify those variables that manifest aberrant values or activity levels just prior to the onset of the attack.

Once specific precursor events have been identified, the network and network devices are continuously and automatically monitored for the presence of these precursors. Detection of the presence of a precursor triggers protective action. In a preferred embodiment, the monitoring and triggering functions reside in one or more network management or element management systems, and the protective actions are therefore automatically undertaken by the management system. This provides an advantage because the time lapse between detection of a precursor event and the onset of an attack may be on the order of minutes to seconds. However, other implementations known in the art are contemplated by the inventors and considered to be within the scope of the invention, including, but not limited to, an embodiment where the monitor triggers an alarm that notifies a human administrator of the imminent attack. If utilized, the network management component may be filled by Aprisma Management Technologies Spectrum™, HP OpenView, or any other compatible network management system.

Protective actions that may be taken include, but are not limited to, one or more of: shutting down the Attacking Machine, shutting down the Target, discarding traffic from the Attacking Machine before it reaches the Target, raising an alarm or report in a console or notification apparatus (e.g. pager, voicemail), contacting authorities by email or other communication method, substituting a vicarious device or network for the Target, initiating a process that attempts to discover the source of the attack, and/or initiating other manual or automated investigatory procedures.

The present invention, as described above, may be better understood with reference to FIG. 1. FIG. 1 is a high-level operational flowchart for an embodiment of the method for predicting and preventing attacks in communications networks according to the present invention. As shown in FIG. 1, data is collected 110 from network devices during a real or simulated network attack. The collected data is then analyzed to identify 120 specific precursors of the attack. In this embodiment, triggers responsive to the presence of the identified precursors are then placed 130 into the relevant network or element management systems, which then monitor 140 the network and/or network devices for the presence of the precursors. When the presence of a precursor is detected 150, appropriate protective action is taken 160.

Figure 2:
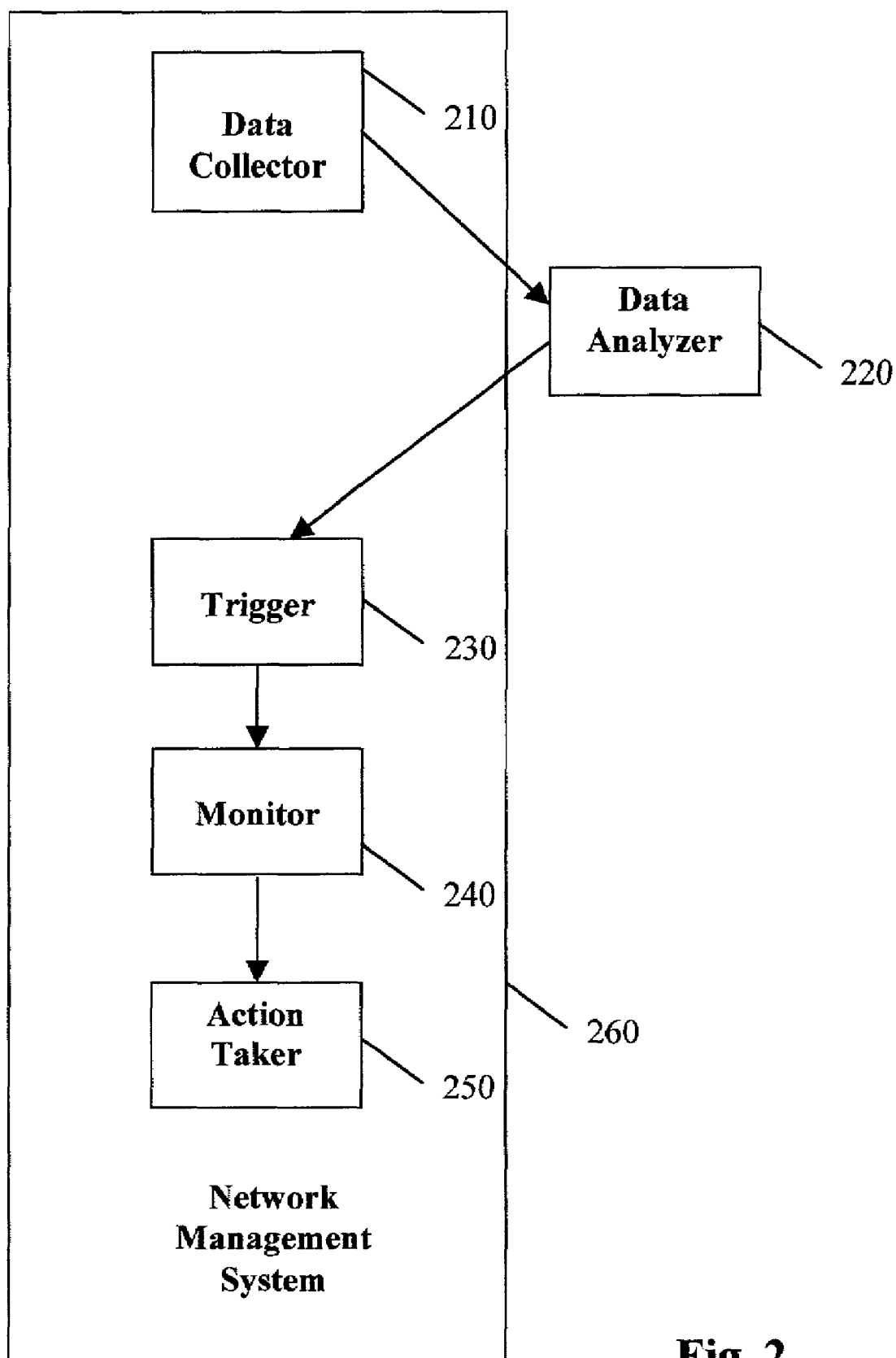
FIG. 2 is a block diagram of an example implementation of the apparatus for predicting and preventing attacks in communications networks of the present invention.

FIG. 2 is a block diagram of an example implementation of the apparatus for predicting and preventing attacks in communications networks of the present invention. As shown in FIG. 2, one or more data collection means 210 are utilized to collect data values during an attack on a communications network. The collected data is then processed by a data analyzing system 230, which identifies specific precursor events of the network attack. One or more triggers 230 responsive to the detection of the identified precursors are then incorporated into the network or network devices. A monitor 240 continuously checks for the presence of the identified precursors. When the monitor 240 detects the presence of a precursor, one or more of triggers 230 signal the action-taking means 250 to take appropriate protective action. In a preferred embodiment, the data collection means 210, triggers 230, monitor 240, and action-taker 250 are all implemented within a Network Management System 260.

By way of example, a particular embodiment of the invention focuses on detecting and preventing damage from a particular kind of attack, a Distributed Denial of Service (DDoS) Attack. Note, however, that the application of the invention is not limited to DDoS attacks; the invention may used to prevent any type of attack on a communications network or device. Distributed Denial of Service (DDoS) Attacks have been receiving large attention from the general media since early 2000, when a series of massive Denial of Service attacks incapacitated several popular e-commerce sites. In D. Moore, G. M. Voelker, and S. Savage, "Inferring Internet Denial-of-Service Activity," *Proceedings of the* 2001 *USENIX Security Symposium*, Washington, D.C., 2001, a technique called backscatter analysis was utilized to estimate the prevalence of DoS attacks in the Internet. During a three-week period in February 2001, over 12,000 DoS attacks were observed on over 5,000 distinct Internet hosts belonging to more than 2,000 distinct organizations.

The specific goal of this example embodiment of the invention is to identify precursors of DDoS attacks in order that such an attack may be halted before causing damage. To understand this example embodiment it is necessary to first understand how DDoS attacks work, starting with the attacker's initial lodging of programs into selected machines and ending with the shutdown of the target machine. In particular, the steps in a DDoS attack need to be understood and expressed in terms of a timeline of events. Although there are quite a large number of events that occur prior to an attack (e.g. suspicious logons, start of processes, addition of new files, sudden shifts in traffic, etc.), in this example embodiment only information from Management Information Base (MIB) Traffic Variables was collected from the systems participating in the Attack.

Figure 3:
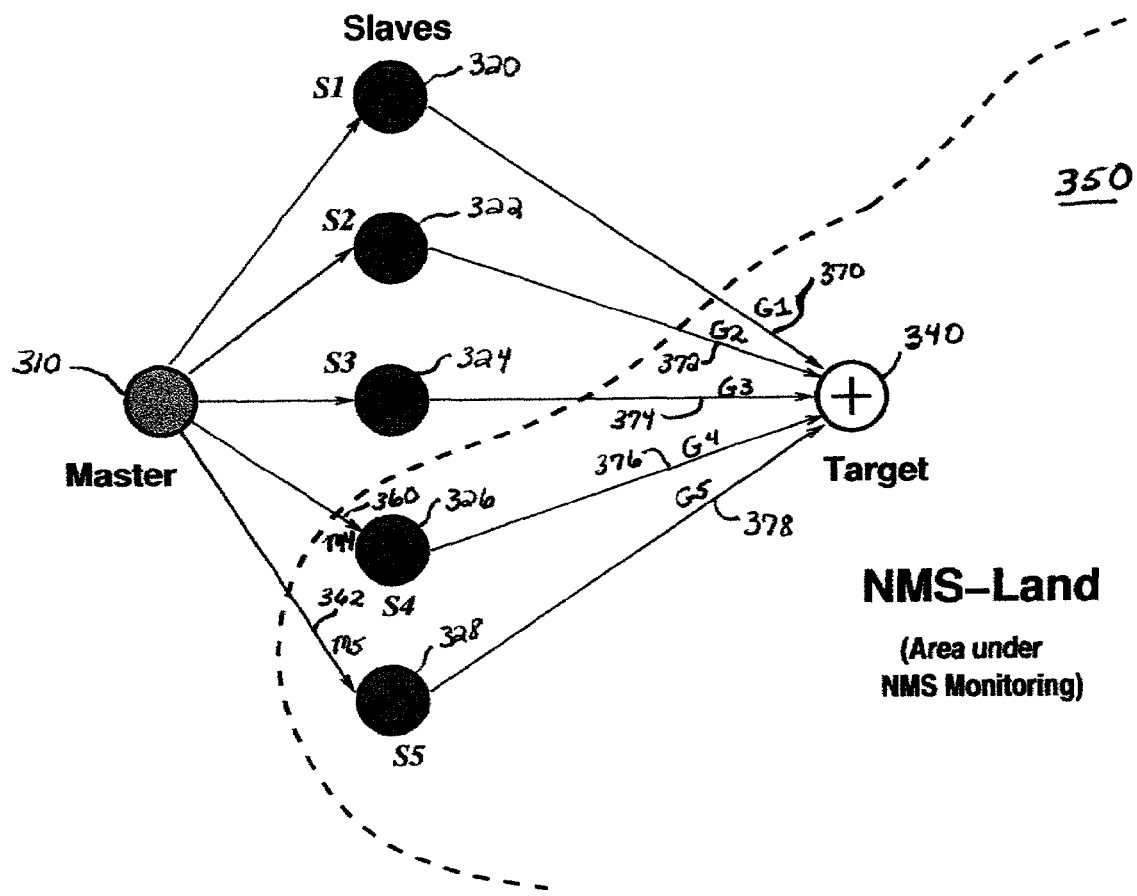
FIG. 3 is a diagram illustrating an example topology of a typical Distributed Denial of Service attack.

A technical analysis of DDoS attacks is given in P. J. Criscuolo, "Distributed Denial of Service—Trin00, Tribe Flood Network, Tribe Flood Network 2000, and Stacheldraht," *Technical Report CIAC*-2319, Department of Energy—CIAC (Computer Incident Advisory Capability), February 2000 ("Criscuolo"). According to this report, the DDoS attacks have two phases and involve three classes of systems. A simplified topology for a typical DDoS attack is shown in FIG. 3. As shown in FIG. 3, the Master system or device 310 established by the attacker controls one or more Slave systems or devices S1 320, S2 322, S3 324, S4 326, and S5 328. The Master 310 is used by the attacker to direct the Slaves 320, 322, 324, 326, 328 to attack the Target machine 340.

Not all of these systems are under supervision by the local network management system (NMS). In the example embodiment of the present invention, it is assumed that the Master 310 is not under NMS monitoring, but that the Target 340 and a few Slaves (but not all) are. In FIG. 3, Slave S4 326 and S5 328 are under supervision from the NMS. "Being under NMS monitoring" means that the NMS is capable of recording the activity of the system. In the case of the Slaves, it does not necessarily mean that the NMS is aware that a particular system is a DDoS Slave. As the attack proceeds, however, the NMS may infer it, and then take appropriate action.

FIG. 3 therefore shows how a DDoS is set up by a malicious hacker. In FIG. 3, "NMS-Land" 350 is the ensemble of all systems under the NMS monitoring. Besides slaves S4 326 and S5 328, all other systems inside NMS-Land 350 along the path between the Master 310 and the Target 340 are places in the network where significant events can be recorded. These events are observable by the NMS and precede the ultimate completion of the second phase of the DDoS attacks. These are the events that may be used for proactive detection.

A locale is defined as an ensemble of systems, including routers, computers, etc. Two particular classes of locales may be defined in NMS-Land 350, as shown in FIG. 3:

1. M4 360 and M5 362 represent those systems inside NMS-Land along the path between the Master and S4 326 and S5 328 respectively.

2. G1 1370, G2 372, G3 374, G4 376, and G5 378 represent the systems inside NMS-Land 350 along the path between the Slaves Si and the Target 340.

The Master system coordinates the whole effort. In the first phase of the attack, the Master infiltrates multiple computer systems and installs the DDoS tools, which are scripts capable of generating large volumes of traffic under command from the Master. Details on these scripts are given in Criscuolo and references therein. These infiltrated systems are now the Slaves. The second phase of the attack cannot take place until the first phase is completed.

The second phase is the actual DDoS attack. Under command from the Master, the Slaves generate network traffic to bring down the Target system. Any system connected to the Network can be a Target. Routers and web servers are typical examples. Although the nature of the traffic (UDP, ICMP, etc.) differs among the various types of DDoS attacks, the common factor is the abnormally large number of connections attempted to the Target system during a very small interval of time. Although the processing of this traffic usually shuts down the Target system, it typically does not matter how the Target handles the packets; the volume of traffic is so great that the whole network becomes congested with artificial traffic. The congestion does not allow legitimate traffic to pass, thus rendering the Target inaccessible and making the DDoS attack ultimately successful.

Figure 4:
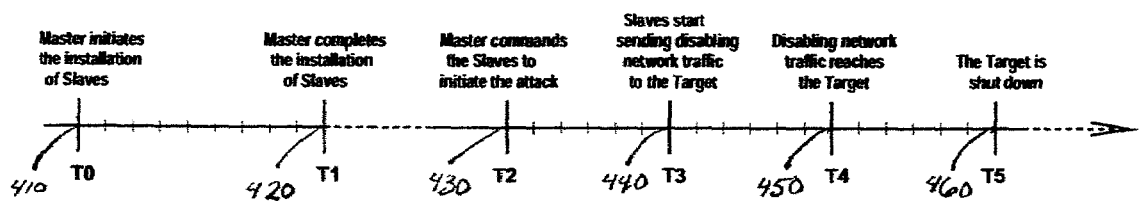
FIG. 4 illustrates a simplified timeline for a typical Distributed Denial of Service attack.

FIG. 4 shows the temporality of DDoS-type attacks as a simplified timeline, starting with the installation of slaves and continuing until target shutdown. The NMS keeps a universal reference clock. All times are measured at this clock, whether or not the NMS is aware of the event defining a particular time entry. As shown in FIG. 4, T0 410 represents the time at which the Master begins to install the Slaves. The installation procedure itself is very complex and lasts until T1 420. T1 420 is the instant when the last Slave is completely installed. T1 420 therefore marks the last communication between the Master and the Slaves before the start of the second phase of the attack. During the interval of time between T0 and T1, several recordable events of interest concerning the installation of Slaves happen at S4 and S5, as well as at M4 and M5.

At time T2 430, the Master commands the Slaves to initiate the Attack. T2-T1 can be days or weeks. The decision to start the attack at time T2 430 is an entirely human decision, made by the Master alone. At time T3 440, the Slaves begin sending disabling network traffic to the Target. This disabling traffic begins reaching the Target at time T4 450. At time T5 460, the Target is disabled and/or shut down. The time elapsed between T2 and T5 is usually much smaller than that elapsed between T1 and T2. Assuming that there is no feedback between Master and Slaves, the sequence of events during the interval T2 to T5 is entirely determined by the interaction between the DDoS tools residing in the Slaves and the network.

Once the general nature of the type of attacks of interest are understood, experiments are set up in which (i) attacks are simulated, (ii) data is collected from all systems involved, and (iii) the data is analyzed with statistical algorithms in order to learn probable precursors of Target shutdowns. In the particular experiment described herein, it was desired to determine how long prior to T5 (FIG. 4) it was possible to predict the Target shutdown at T5. The systems of interest at this stage were therefore S4, S5, and Gi, i=1, . . . , 5.

In order to identify precursors of the attack, data must be collected from the systems of interest during both a normal state of the network and an attack state. Note that although the data for the example embodiment are MIB traffic variables, the invention is not limited to MIB-based data. It may also encompass other types of data, including, but not limited to, Remote Monitoring (RMON) data, CMIP-based data, and data based on proprietary protocols.

Three types of DDoS attacks were effected on a Research Test Bed and MIB variables were recorded at the attacking and target machines. Using these datasets, it was determined that there are MIB-based precursors of DDoS attacks that render it possible to detect the attacks before the Target is shut down. The relevant MIB variables at the Attacker can be extracted automatically using, for example, Statistical Tests for Causality. Statistical Tests applied to the time series of MIB traffic at the Target and the Attacker are highly effective tools for extracting the correct variables for monitoring in the Attacker Machine. Following the extraction of these key variables at the Attacker, an Anomaly Detection scheme, based on a simple model of the normal rate of change of the key MIBs, is used to determine statistical signatures of attacking behavior. This allows implementation of an entirely automated procedure, optionally centered on Network Management Systems, for detecting precursors of Distributed Denial of Service Attacks and responding to them.

Figure 5:
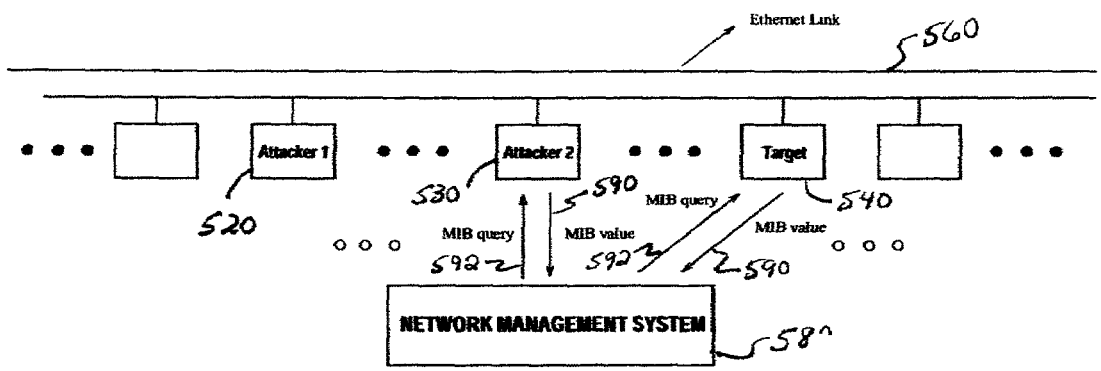
FIG. 5 is a block diagram of the North Carolina State University test network utilized for experimental implementations of the present invention.

The experimental dataset for studying DDoS attacks was produced at North Carolina State University (NCSU) on a research network with the topology depicted in FIG. 5. As shown in FIG. 5, Attacking Machine1 520, Attacking Machine2 530 and Target Machine 540 are connected via an Ethernet link 560. All of the machines 520, 530, 540 are under control of, and thus subject to monitoring by, a Network Management System 580. The Target operating system was Red Hat Linux 6.1 (kernel: 2.2.12-20 smp), the Attacker1 operating system was Red Hat Linux 6.2 (kernel: 2.2.14-50), and the Attacker2 operating system was Sun OS 5.5.1.

For this particular experiment, MIB values 590 were collected by the Network Management System 580 from the attacking 520, 530 and target 540 machines via MIB queries 592. The Network Management System 580 on the research network collected 91 MIB variables corresponding to five MIB groups: ip, icmp, tcp, udp and snmp. Definitions of the MIB variables for all groups are available in W. R. Stevens, *TCP/IP Illustrated, Vol.* 1: *The Protocols*, Addison-Wesley, 1994, pp. 363-388. Variables were collected for intervals of 2 hours, at a sample rate of 5 seconds.

Two runs each of three types of DDoS attacks were produced by TFN2K (Ping Flood and Targa3) and Trin00 (UDP Flood). See *Criscuolo* for descriptions of the DDoS tools and attack types. During each of the attacks, MIBs were collected for the Attacking Machine (Attacker1 or Attacker2 in FIG. 5) and for the Target. The time series for MIB variables corresponding to counter variables were differentiated. Two runs were recorded for each type of attack.

According to the terminology introduced in conjunction with FIG. 3, Attacker 1 and Attacker 2 are Slaves. The Master is not under monitoring from the Network Management System. The dataset includes events starting at T2; the DDoS tools were assumed to already be installed on the Attacking Machines (Slaves) when the Attack Runs started. Hence, the Proactive Rules derived through this experiment only relate events in T2 or T3 with events in T4 and T5.

For statistical comparison purposes, MIB variable values were also collected during times when the machines were not being the target of attacks nor being the attacker. Twelve normal (non-attack) runs were collected for the Target Machine, seven normal runs were collected for Attacker1, and fourteen normal runs were collected for Attacker2.

Figure 6:
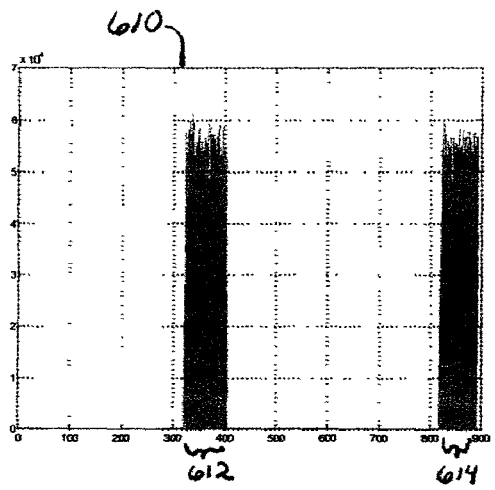
FIG. 6 depicts the evolution of selected MIB variables at the Target Machine during an experimental TFN2K Ping Flood attack.
Figure 6:
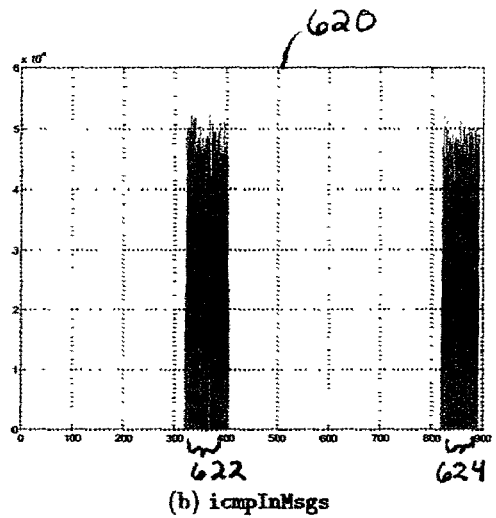
Figure 6:
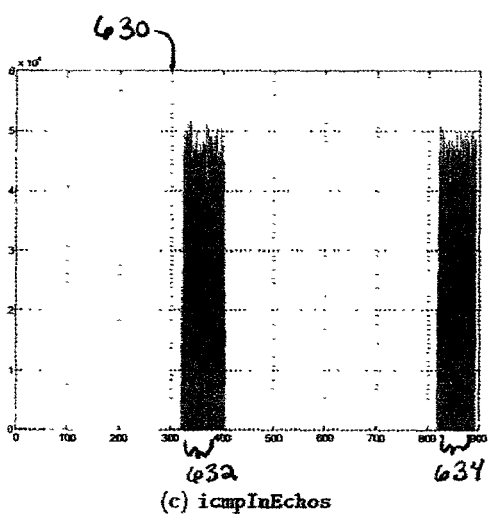
Figure 6:
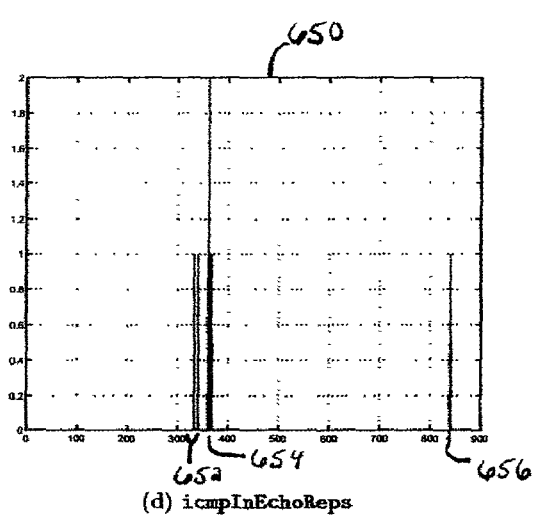
Figure 6:
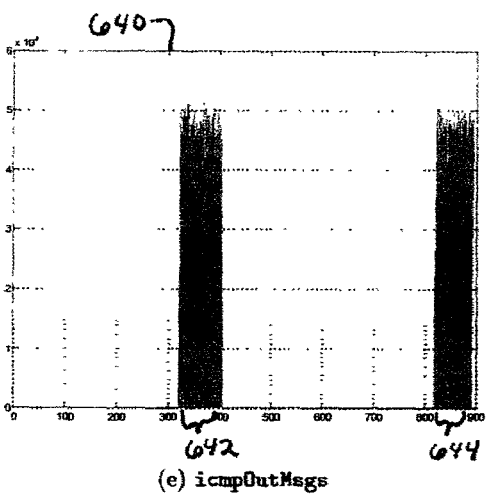
Figure 6:
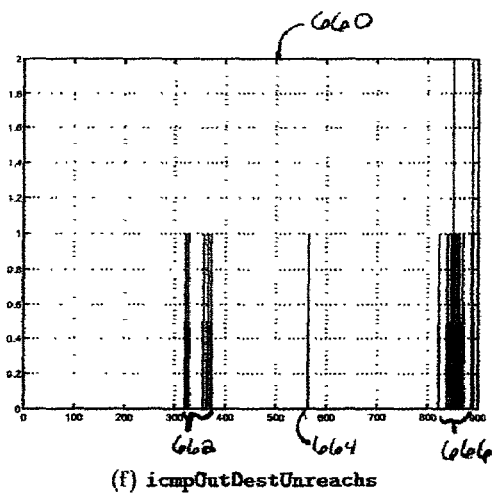

To illustrate the nature of MIB variables and their relevance for attack detection, FIG. 6 depicts the evolution of the values of six relevant MIB variables at the Target Machine during the first Ping Flood attack produced by TFN2K. The run lasted for 892 samples (74 minutes, 20 seconds). The Target was flooded with pings two times during the run.

As seen in FIG. 6, the graph of the evolution of the MIB variable ipInReceives 610 has two major peaks of over $5\times10^4$, the first 612 lasting from around sample 320 to sample 410 and the second 614 lasting from around sample 820 to sample 892 (the last sample taken). Similarly, the graph of MIB variable icmpInMsgs 620 shows two major peaks 622, 624 of over $4\times10^4$ during the same time period. The graphs for the two MIB variables icmpInEchos 630 and icmpOutMsgs 640 similarly each show two major peaks 632, 634, 642, 644 of over $4\times10^4$ during the same two periods. The graph of MIB variable icmpInEchoReps 650 shows two major peak groups 652, 654, the first occurring between sample 330 and sample 380 and another occurring between samples 840 and 850. The graph of MIB variable icmpOutDestUnreachs 660 show a major peak group 662 occurring between samples 320 and 380, a second 664 occurring between samples 560 and 570, and a third 666 occurring between samples 820 and 892.

As can clearly be seen from FIG. 6, the variables icmpInMsgs, icmpInEchos, icmpInEchoReps and icmpOutEchos are Key Variables for detecting Ping Flood Attacks, since they are related to the inflow of pings (ICMP Echo Request messages) in the Target machine. The Ping attack is also detectable at the IP layer, through ipInReceives.

Figure 7:
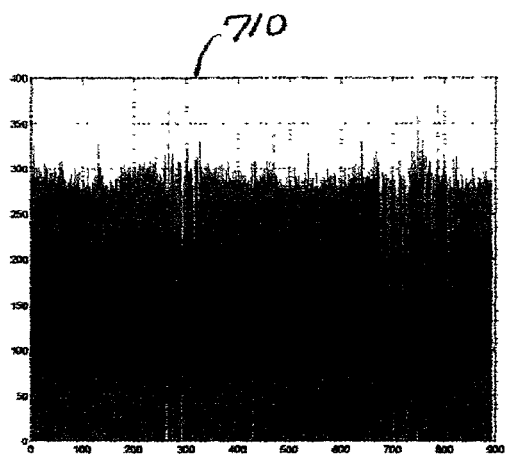
FIG. 7 depicts the evolution of selected MIB variables at the Attacking Machine during the experimental TFN2K Ping Flood attack of FIG. 7.
Figure 7:
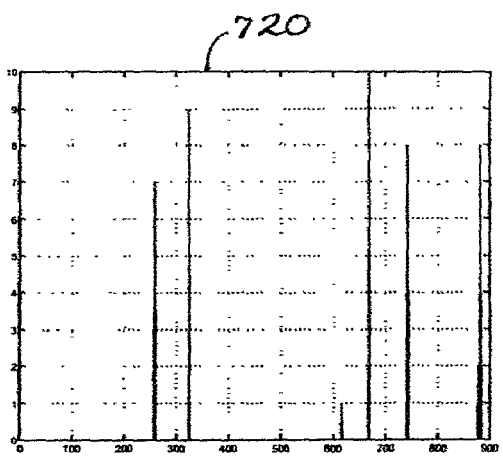
Figure 7:
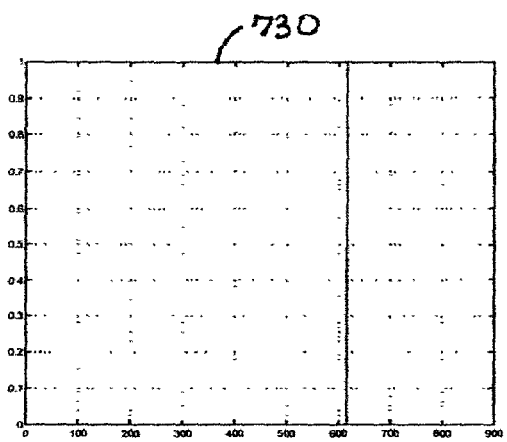
Figure 7:
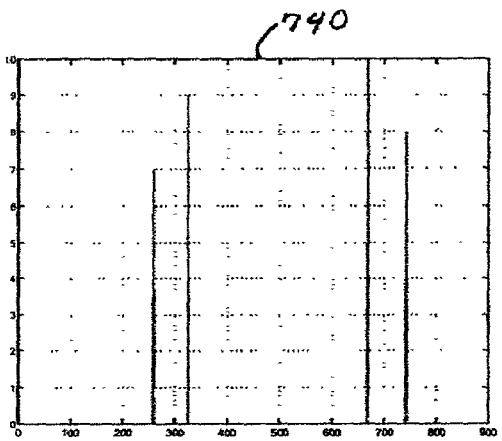
Figure 7:
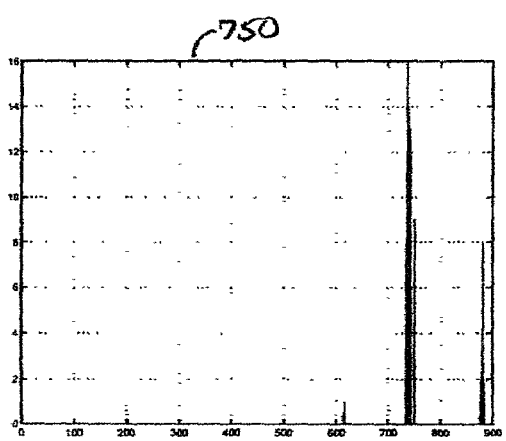
Figure 7:
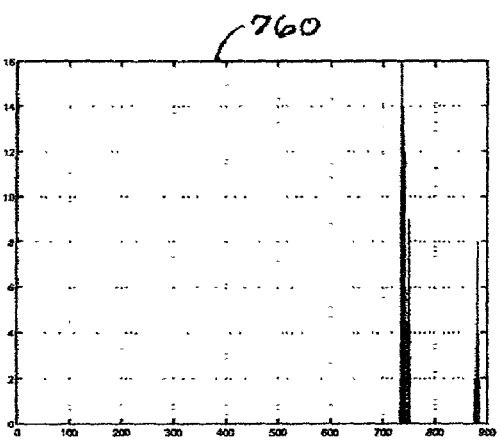

FIG. 7 shows the evolution of these same MIBs at the Attacker Machine during the run. In FIG. 7, the graph of the evolution of MIB variable ipInReceives 710 shows some peaks just before the ping flood attack begins, in particular around samples 270, 330, 480, 640, 670, 760, and 790. The graph of MIB variable icmpInMsgs 720 shows six peaks at around samples 270, 330, 620, 670, 740, and 890. The MIB variable icmpInEchos 730 has a major peak around sample 620. The graph of MIB variable icmpInEchoReps 740 shows four major peaks around samples 270, 330, 670, and 740. The graph of MIB variable icmpOutMsgs 750 has three major peak groups occurring around samples 620, 730, and 880, while the graph of MIB variable icmpOutDestUnreachs 760 shows peak groups occurring around samples 730 and 880. It may be noted that the outbound pings are not detectable through icmpOutMsgs; this is because the outbound pings had spoofed IP addresses.

Figure 8:
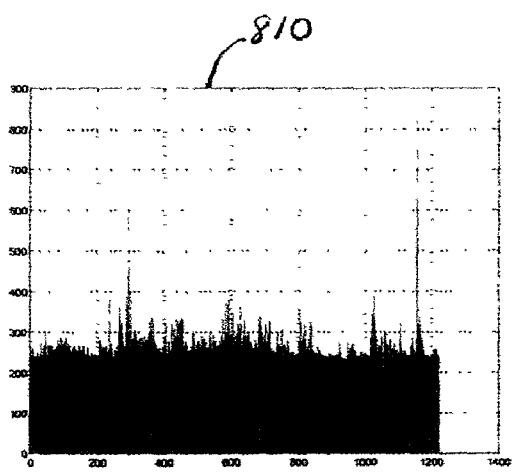
FIG. 8 depicts the evolution of selected MIB variables at the Target Machine during an experimental normal (non-attack) run.
Figure 8:
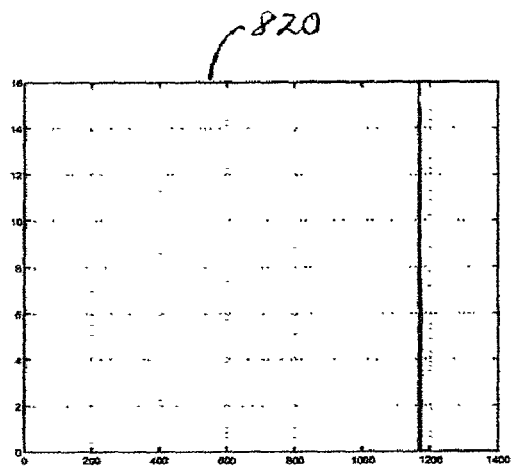
Figure 8:
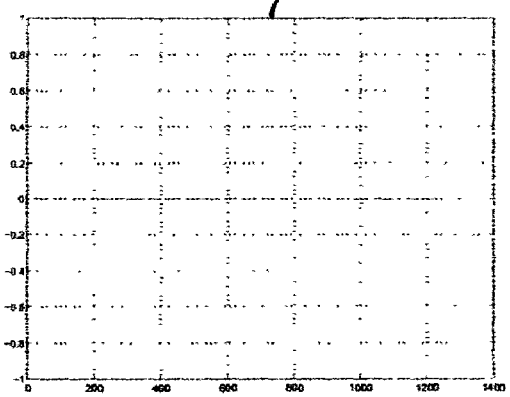
Figure 8:
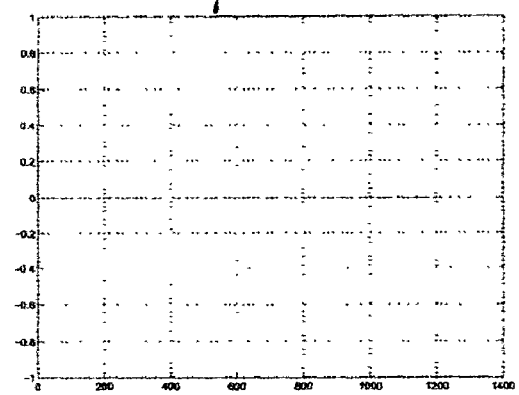
Figure 8:
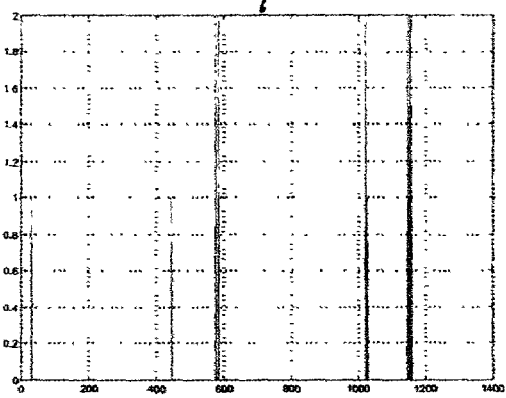
Figure 8:
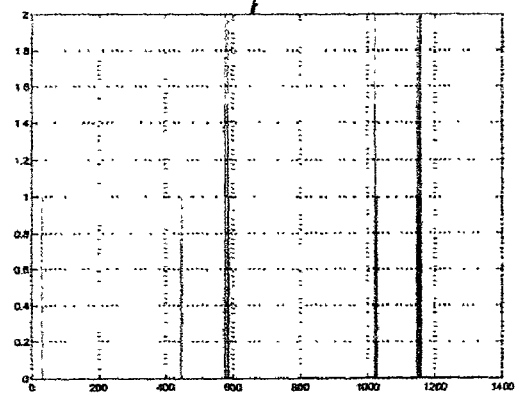

For comparison, FIG. 8 shows the evolution of these same six MIB variables, ipInReceives 810, icmpInMsgs 820, icmpInEchos 830, icmpInEchoReps 840, icmpOutMsgs 850, and icmpOutDestUnreachs 860, at the Target Machine during a normal run. The normal run lasted for 1222 samples (101 minutes, 50 seconds). It is particularly important to notice the large difference in scale between the peak values seen in FIG. 8 and those seen in FIG. 6.

Figure 9:
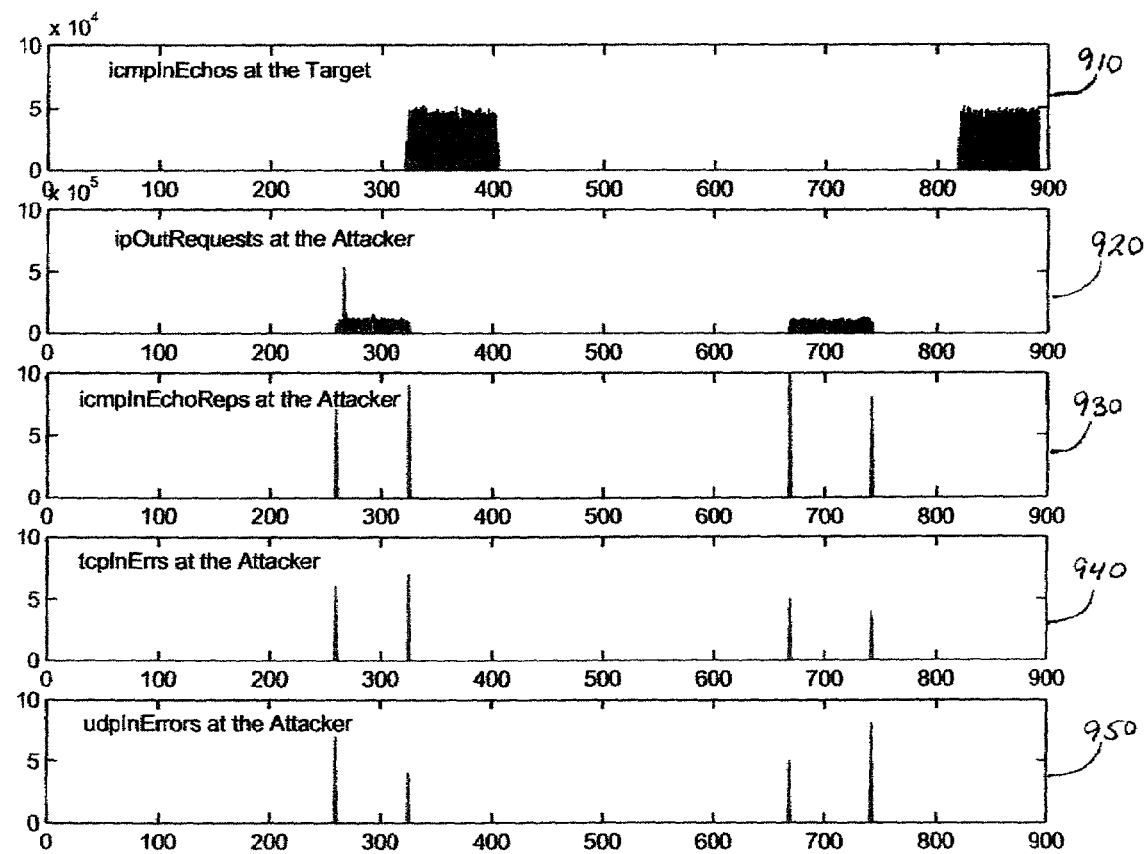
FIG. 9 is a comparison of the evolution of selected MIB variables at the Attacking and Target Machines during the experimental TFN2K Ping Flood attack of FIGS. 6 and 7.

FIG. 9 compares selected MIB variables at the Attacker and Target, specifically icmpInEchos 910 at the Target Machine versus the four MIB variables at the Attacker Machine that show remarkable activity before the pings reach the target (ipOutRequests 920, icmpInEchoReps 930, tcpInerrs 940, and udpInErrors 950). Three particular remarks can be made regarding FIG. 9:

1. Although the outbound pings are not visible at the ICMP level, it appears that there are a large number of IP requests at the Attacker preceding the flood at the Target. This would be a 73 event, according to FIG. 4.
2. About 30 samples before the first Ping flood, and about 60 samples before the second ping flood, the Attacker receives a few icmpEchoReply packets. According to *Criscuolo*, the communication between Master and Slave in TFN2K happens through ICMP, UDP or TCP. These icmpEchoReply packets are therefore the command from the Master to the Slave to initiate the attack. These therefore constitute a T2 event, according to FIG. 4.
3. Two other MIBs at the TCP and UDP groups in the Attacker also show variations that coincide with the variations in icmpInEchoReps 930.

These four Attacker variables were originally selected from domain knowledge about the TFN2K Ping Flood attack. In practice, a procedure is needed to automatically extract Key Variables for the Attacker from the entire collection of MIB data at the Attacker Machine. Such a procedure is described in the following paragraphs, and the results are presented for the case of the TFN2K Ping Flood Attack, the TFN2K Targa3 attack, and the Trin00 UDP Flood Attack. The procedure described is an example implementation of the methodology of the invention, wherein the method is applied to the datasets obtained in the Attack and Normal Runs.

Given a large database describing the operation of an Information System, the problem of extracting Proactive Rules for Security can be viewed as consisting of three steps. These steps are performed off-line and produce a set of rules to be used for detecting security violations on-line. While the focus of this example embodiment is Distributed Denial-of-Service Attacks, the methodology described herein can be applied to any other type of Security Violations in which causal relationships may be inferred from measured variables.

1. Detecting Attacks. The objective is to determine which variables in the Target Machine best characterize the occurrence of an attack (events T4 and T5). These variables are called the Key Variables at the Target. This step is performed offline and is akin to a forensic examination, because it is already known that an attack took place. The final product of this step is the list of Key Variables at the Target.

There are at least two possible procedures for determining the Key Variables at the Target. One method is to use domain knowledge about the attack. For example, for the Ping Flood illustrated in FIG. 6, it is known that icmpInEchos is the right variable to look at, since Ping Floods are effected by sending icmpInEchos packets to a Target. A second possible method is to compare the evolution of each variable during an attack with the evolution of the variable during normal operation. Variables that display a large variation between normal and attack operation are then declared Key Variables at the Target.

Since localized variations in the variables are being examined, the time series can be segmented on small subtime series, which are then compared with normal profiles. This procedure has been used in the past for detecting anomalies in network operation due to component faults. In that case, anomalies were detected as variations on the parameters of AutoRegressive models. For the case of Denial-of-Service attacks, however, the traffic variations in the Target are so intense that much simpler procedures can be employed. The situation in FIG. 6 is typical; the value of MIB variable icmpInEchos grows from 0 to 50,000 abruptly. It is therefore possible to detect the presence of such attacks simply by averaging the time series along properly chosen intervals. It has previously been shown that for large classes of Denial-of-Service attacks, the traffic variables represent the main feature of interest. In this experiment, therefore, domain knowledge about the attacks was utilized for extracting the Key Variables at the Target.

2. Detecting Correlations. Once the Key Variables at the Target are identified, it is necessary to identify variables in the prospective Attacker Machines that are causally related to them. These variables at Attacker Machines are related to events T2 and T3. Recall that it is not known which ones are the Attacking Machines; all that is known is a list of candidates and their corresponding variables. The assumption is made that any causal relationship between variables at prospective Attackers and the Key Variables at the Target is to be inferred as a link between the Attacker and the Target. The final product of this step is the list of Key Variables at the Attacker.

3. Detecting Precursors to Attacks. Following the detection of Correlations, particular features of the Key Variables at the Attacker that precede the attack at the Target are identified. These variables were found in Step 2 to be causally related with the Attack; hence, it is expected that certain specific anomalies in the values of these variables may be indicative of an incoming attack. Once these features are determined and are shown to precede the Attack, Proactive Rules may be constructed that constitute the end product of this step. These Proactive Rules may then be used for implementing alarms on an NMS.

Inspection of the DDoS scripts and experiments led to the conclusion that the Key Variables at the Target for the three attacks were:

1. TFN2K Ping Flood: The Ping Flood attack is effected by sending a large amount of ICMPECHOREQUEST packets to the Target. Clearly, icmpInEchos is the Key Variable at the Target in this case.

2. TFN2K Targa3: The Targa 3 attack is effected by sending combinations of uncommon IP packets to the Target. These uncommon packets consist of invalid fragmentation, protocol, packet size, header values, options, offsets, TCP segments and routing flags. MIB variables reflecting errors at different layers can be used as Key Variables at the Target; in this example case, ipReasmFails was selected.

3. Trin00 UDP Flood: the UDP Flood Denial-of-Service Attack is created when the Attacker sends UDP packets to random ports on the Target. The variable udpInDatagrams was utilized as the Key Variable at the Target for this case.

Next, the variables at the Attacker Machine that are causally related to the Key Variables in the Target were identified. Since the desired outcome was a set of Proactive Rules, it was necessary to determine variables at the Attacker that contain events that precede the Attack detection at the Target. These events can be T2 events or T3 events.

In this example, Causality Tests were used for determining these Key Variables at the Attacker; however, any correlative method known in the art may be utilized. Testing for causality in the sense of Granger, involves using statistical tools for testing whether lagged information on a variable u provides any statistically significant information about a variable y. If not, then u does not Granger-cause y. The Granger Causality Test (GCT) compares the residuals of an AutoRegressive Model (AR Model) with the residuals of an AutoRegressive Moving Average Model (ARMA Model). To apply the Causality test, assume a particular lag length p, and estimate the following unrestricted equation:

$$y(k) = \sum_{i=1}^{p} a_i y(k-i) + \sum_{i=1}^{p} \beta_i u(k-i) + e_1(k)$$

The Null Hypothesis $H_0$ of the GCT is given by:

$$H_0: \beta_i = 0, i=1,2,\ldots,p,$$

i.e. u does not affect y up to a delay of p units. The null hypothesis is tested by estimating the parameters of the following restricted equation:

$$y(k) = \sum_{i=1}^{p} \delta_i y(k-i) + e_0(k)$$

Let $R_1$ and $R_0$ denote the sum of the squared residuals under the two cases: T $$R_1 = \sum_{k=1}^{T} e_1^2(k)$$

$$R_0 = \sum_{k=1}^{T} e_0^2(k)$$

If the test statistic g given by:

$$g = \frac{(R_0 - R_1)/p}{R_1/(T-2p-1)} \sim F(p, T-2p-1)$$

is greater than the specified critical value, then reject the null hypothesis that u does not Granger-cause y. Here, F(a, b) is Fisher's F distribution with parameters a and b. In other words, high values of g are to be understood as representing strong evidence that u is causally related to y. In the traditional sense, this is expressed that $u_1$ is more likely to be causally related to y if $g_1 > g_2$, where $g_i$, i=1, 2 denote the GCT statistic for the input-output pair ($u_i$, y).

The GCT was applied by comparing the residuals of the AutoRegressive (AR) Model corresponding to the Key Variables at the Target with the AutoRegressive Moving Average (ARMA) Models corresponding to the input-output pairs, where the output is the Key Variable at the Target and the inputs are one of the 64 MIB variables at the Attacker, corresponding to the ip, icmp, tcp and udp groups. From, e.g., *Criscuolo*, domain knowledge (ground-truth) is known for the Key Variables at the Attacker. The Deterministic Stochastic Realization Algorithm (DSRA) is then used to fit ARMA models to input-output pairs, and the Stochastic Realization Algorithm (SRA) is used to fit AR models to the output.

The GCT was applied to the datasets obtained during the two runs of each of the three types of DDoS attacks. T4 events happen more than once in each run; for example, the Target Machine received two "volleys" of pings during the course of Run 1 for TFN2K Ping Flood. The duration of the runs also varies from case to case. Table 1 gives the statistics for each of the Attack Runs, the parameters for the GCT, and the thresholds for the g statistic for various significance levels for each case. These thresholds are the critical levels corresponding to F(p, T−2p−1).

TABLE 1

Statistics for the Attack Runs, parameters for the GCT, and thresholds for the g statistics for various significance levels. These thresholds are the critical levels corresponding to $F(p, T - 2p - 1)$.

| DDoS Attack | Run | Samples | T4 Events | p | T | 99.9% | 99% | 98% | 95% |
|---|---|---|---|---|---|---|---|---|---|
| TFN2K Ping Flood | 1 | 892 | 2 | 100 | 792 | 1.55 | 1.40 | 1.35 | 1.27 |
| TFN2K Ping Flood | 2 | 1016 | 3 | 120 | 896 | 1.49 | 1.37 | 1.31 | 1.24 |
| TFN2K Targa3 | 1 | 825 | 3 | 100 | 725 | 1.56 | 1.41 | 1.35 | 1.27 |
| TFN2K Targa3 | 2 | 977 | 3 | 100 | 877 | 1.54 | 1.40 | 1.34 | 1.27 |
| Trin00 UDP Flood | 1 | 582 | 2 | 80 | 502 | 1.65 | 1.47 | 1.40 | 1.31 |
| Trin00 UDP Flood | 2 | 991 | 3 | 100 | 891 | 1.54 | 1.39 | 1.34 | 1.27 |

A scenario was established in which there were nine potential Attackers against the Target: the true attacker and eight decoys corresponding to the normal runs. The GCT was then applied to measure the causality strength of all MIB variables at the potential attackers with respect to the Key Variable at the Target for each of the attacks. MIB variables at potential attackers resulting in a GCT statistic above the threshold for 95% significance level were considered to Granger-cause the Key Variables at the Target and were kept for analysis. Detections were counted whenever the ground-truth variables were correctly picked by the GCT. False alarms correspond to MIB variables being flagged in the decoys.

As an example, Tables 2 and 3, as well as the first two columns of Table 10, display the results and g statistic for the top MIBs for the first and second run of the TFN2K Ping Flood Attack. Only the MIBs corresponding to a significance level of 95% are listed; all others do not Granger-cause icmpInEchos at the Target with a significance level of 95%. The four variables presented in FIG. 7 appear in Table 2, as well as icmpEchoReps, which appears in Table 3. This example strongly suggests that the g statistic can be used effectively for automatically extracting MIB variables at the Attacker Machine that are causally related to the Key Variables at the Target Machine.

TABLE 2

TFN2K Ping Flood Run 1: Top MIBs at the Attacker according to the g statistic

| Rank | MIB | g |
|---|---|---|
| 1 | ipOutRequests | 5.26 |
| 2 | tcpInErrs | 3.50 |
| 3 | ipInReceives | 2.67 |
| 4 | ipInDelivers | 2.65 |
| 5 | udpInErrs | 2.63 |
| 6 | udpOutDatagrams | 2.58 |
| 7 | udpInDatagrams | 2.57 |
| 8 | icmpInEchoReps | 2.04 |
| 9 | icmpInMsgs | 1.99 |
| 10 | tcpInSegs | 1.31 |
| 11 | udpNoPorts | 1.27 |

TABLE 3

TFN2K Ping Flood Run 2: Top MIBs at the Attacker according to the g statistic

| Rank | MIB | g |
|---|---|---|
| 1 | icmpInMsgs | 1.45 |
| 2 | icmpInEchoReps | 1.45 |

To verify the conclusions of the GCT when the Attacker Machine is operating normally, the g was determined for eight normal runs of Attacker Machines (either Attacker1 or Attacker2) with respect to icmpInEchos in the Target Machine for Run 1 and Run 2. Only Normal Runs that were at least as large as the Attack Runs were considered. Tables 4 and 5 summarize these results for each network configuration. The significance level is 95%.

TABLE 4

TFN2K Ping Flood Run 1: Performance of the GCT for normal runs at the Attacker.

| Run | Max. g | No. Significant MIBs |
|---|---|---|
| 1 | 2.41 | 7 |
| 2 | 0.77 | 0 |
| 3 | 0.64 | 0 |
| 4 | 1.62 | 3 |
| 5 | 1.79 | 1 |
| 6 | 3.25 | 10 |
| 7 | 1.29 | 2 |
| 8 | 1.08 | 0 |

TABLE 5

TFN2K Ping Flood Run 2: Performance of the GCT for normal runs at the Attacker.

| Run | Max. g | No. Significant MIBs |
|---|---|---|
| 1 | 5.86 | 6 |
| 2 | 1.15 | 0 |
| 3 | — | — |
| 4 | 1.11 | 0 |
| 5 | 1.40 | 1 |
| 6 | 0.88 | 0 |
| 7 | — | — |
| 8 | 5.34 | 7 |

Ideally, no MIBs from these Normal Runs at the Attacker should be labeled as being casually related to icmpEchos. However, due to the statistical nature of the test, false alarms may appear. Tables 4 and 5 present the maximum g value among all MIBs on each run and the total number of "significant" MIBs, i.e. the MIBs that could not be rejected as possibly Granger-causing icmpInEchos at the Target with a significance level of 95%. The false alarm rate for Decoy MIBs is obtained by computing the total number of significant MIB variables found in all normal runs, divided by the total number of MIB variables. Notice that only 23 out of 64×8=512 MIB variables corresponding to normality are considered significant at the 95% level. This gives a rate of false alarm for casuality detection of only 4.5% in Run 1. For Run 2, there are 14 out of 64×6=384, giving false alarm rate of 3.6%. Concerning Tables 2 and 3, it can be seen that at least one "true" MIB variable at the Attacker is detected in each run. This is all that is needed to set up an alarm for Proactive Detection.

the same experiments were performed for TFN2K Targa3. The results are presented in Tables 6 and 7, as well as the last two columns of Table 10. They are roughly similar to the results obtained for the Ping Flood attack

TABLE 6

TFN2K Targa3 Run 1: Top MIBs at the Attacker according to the g statistic

| Rank | MIB | g |
|---|---|---|
| 1 | ipInDelivers | 1.70 |
| 2 | udpOutDatagrams | 1.70 |
| 3 | udpInDatagrams | 1.70 |
| 4 | ipInReceives | 1.68 |
| 5 | udpInErrors | 1.51 |
| 6 | ipOutRequests | 1.32 |

TABLE 7

TFN2K Targa3 Run 2: Top MIBs at the Attacker according to the g statistic

| Rank | MIB | g |
|---|---|---|
| 1 | udpInErrors | 1.28 |

The related normal runs are shown in Tables 8 and 9 respectively. The significance level is 95%.

TABLE 8

TFN2K Targa3 Run 1: Performance of the GCT for normal runs at the Attacker.

| Run | Max. g | No. Significant MIBs |
|---|---|---|
| 1 | 0.96 | 0 |
| 2 | 5.61 | 3 |
| 3 | 1.86 | 5 |
| 4 | 1.17 | 0 |
| 5 | 1.14 | 0 |
| 6 | 1.09 | 0 |
| 7 | 3.55 | 11 |
| 8 | 1.22 | 0 |

TABLE 9

TFN2K Targa3 Run 2: Performance of the GCT for normal runs at the Attacker.

| Run | Max. g | No. Significant MIBs |
|---|---|---|
| 1 | 0.89 | 0 |
| 2 | 4.92 | 3 |
| 3 | 3.60 | 4 |
| 4 | 1.19 | 0 |
| 5 | 1.15 | 0 |
| 6 | 1.25 | 0 |
| 7 | — | — |
| 8 | 1.55 | 4 |

Table 10 summarizes the GCT success results for the two types of TFN2K attacks. Each line in the Table corresponds to MIB variables that are known to be related to the Attack, either as T2 event or a T3 event. An "X" indicates that GCT correctly selected the respective variable at the 95% significance level. The GCT picked all six variables correctly for Run 1 and one T2 variable for Run 2. While it is desirable to identify as many Key Variables at the Attacker as possible, only one variable is actually needed in order to set up a detector. The GCT has picked at least one variable in all experiments (all runs of each of the three different types of attacks). In Run 1 for the TFN2K Ping Flood attack, besides the six "true" MIB variables, the GCT also detected five other MIB variables at the Attacker Machine. These are related to the "true" MIB variables through Case Diagrams and are also causally related to the Key Variable at the Target. The same observation applies also to Run 2 of the TFN2K Ping Flood attack, and to other runs of other attacks.

TABLE 10

GCT successes to TFN2K Runs. "x" indicates that GCT correctly selected the respective variable at 95% significance level.

| MIB | Event | Ping Flood Run 1 | Ping Flood Run 2 | Targa3 Run 1 | Targa3 Run 2 |
|---|---|---|---|---|---|
| icmpInEchoReps | T2 | x | x | | |
| tcpInErrs | T2 | x | | | |
| tcpInSegs | T2 | x | | | |
| udpInErrors | T2 | x | | x | x |
| udpInDatagrams | T2 | x | | x | |
| ipOutRequests | T3 | x | | x | |

Results for Trin00 UDP Flood are shown in Tables 11, 12, and 15. The GCT correctly detected all Key Variables at the Attacker for both Runs. It is noticable from Tables 11 and 12 that several MIB variables from the tcp group were also labeled by the test as being causally related to udpInDatagrams at the Target. Further analysis of the Attack revealed that these tcp-group MIBs are related to utilization of teInet as a way to start the Attack at the Attacker Machine. Although the telnet utilization is only circumstantial to the attack in this case, it was reflected into the MIB values and was correctly picked up by the GCT.

TABLE 11

Trin00 UDP Flood Runs 1: Top MIBs at the Attacker according to the g statistic

| Rank | MIB | g |
|---|---|---|
| 1 | icmpInMsgs | 3.57 |
| 2 | icmpInDestUnReachs | 3.56 |
| 3 | udpOutRequests | 2.70 |
| 4 | ipOutRequests | 2.70 |
| 5 | icmpOutMsgs | 2.64 |
| 6 | icmpOutDestUnReachs | 2.62 |
| 7 | tcpRetransSegs | 1.98 |
| 8 | udpInDatagrams | 1.81 |
| 9 | ipInDelivers | 1.79 |
| 10 | ipInReceives | 1.72 |
| 11 | tcpCurrEstab | 1.56 |

TABLE 12

Trin00 UDP Flood Run 2: Top MIBs at the Attacker according to the g statistic

| Rank | MIB | g |
|---|---|---|
| 1 | icmpOutMsgs | 7.96 |
| 2 | icmpOutDestUnreachs | 7.94 |
| 3 | icmpInMsgs | 3.73 |
| 4 | icmpInDestUnreachs | 3.73 |

TABLE 12-continued

Trin00 UDP Flood Run 2: Top MIBs at the Attacker according to the g statistic

| Rank | MIB | g |
|---|---|---|
| 5 | tcpPassiveOpens | 3.04 |
| 6 | ipOutRequests | 2.94 |
| 7 | udpOutDatagrams | 2.94 |
| 8 | tcpCurrEstab | 2.78 |
| 9 | tcpInSegs | 2.38 |
| 10 | tcpRetransSegs | 2.30 |
| 11 | tcpOutSegs | 2.27 |
| 12 | ipInDelivers | 2.24 |
| 13 | udpInDatagrams | 2.24 |
| 14 | udpNoPorts | 2.13 |
| 15 | ipInReceives | 2.12 |
| 16 | tcpActiveOpens | 1.96 |

The related normal runs are shown in Tables 13 and 14 respectively. The significant level is 95%.

TABLE 13

Trin00 UDP Flood Run 1: Performance of the GCT for normal runs at the Attacker.

| Run | Max. g | No. Significant MIBs |
|---|---|---|
| 1 | 1.23 | 0 |
| 2 | 1.70 | 3 |
| 3 | 2.10 | 5 |
| 4 | 1.76 | 3 |
| 5 | 1.33 | 1 |
| 6 | 1.35 | 2 |
| 7 | 7.04 | 10 |
| 8 | 3.69 | 2 |

TABLE 14

Trin00 UDP Flood Run 2: Performance of the GCT for normal runs at the Attacker.

| Run | Max. g | No. Significant MIBs |
|---|---|---|
| 1 | 3.67 | 2 |
| 2 | 4.10 | 5 |
| 3 | 3.76 | 8 |
| 4 | 1.20 | 0 |
| 5 | 1.54 | 2 |
| 6 | 4.09 | 9 |
| 7 | — | — |
| 8 | 2.77 | 8 |

Table 15 summarizes the OCT success results for the two Trin00 UDP Flood attacks. Each line in the Table corresponds to MIB variables that are known to be related to the Attack, either as T2 event or a T3 event. An "X" indicates that GCT correctly selected the respective variable at the 95% significance level.

TABLE 15

The GCT applied to the Trin00 Runs. x indicates that GCT correctly selected the respective variable at 95% significance level.

| MIB | Event | UDP Flood Run 1 | UDP Flood Run 2 |
|---|---|---|---|
| udpInDatagrams | T2 | x | x |
| udpOutDatagrams | T3 | x | x |
| ipOutRequests | T3 | x | x |

The Key Variables at the Attacker identified in the preceding step are now labeled as causally related to the Attack at the Target, but it is still necessary to find a trigger or a Key Event at the Attacker. This is an Anomaly Detection Problem; in general, any anomalous behavior of Key Variables at the Attacker may be considered Key Events at the Attacker. One possible approach is to look for jumps in the MIB variables, by monitoring the absolute values of the differentiated time series $z(k)=|y(k)-y(k-1)|$. Using 12 Normal Runs, a Normal Profile of Jumps was constructed for each of the 64 MIB variables. Given a Key Attacker Variable identified previously, Key Events at the Attacker are defined as jumps larger than the largest jump encountered in the Normal Profile of Jumps. Key Attacker Variables with no Key Events are discarded. The Key Events are used to set the alarms.

It was found that this procedure led to a substantial reduction of the False Alarms produced by the preceding step, with only small reductions in the attack detection rates. At least one valid precursor is still detected for each Attack Run. These results suggest that this step serves to effectively prune the initial ensemble of candidate MIB variables identified used GCT, producing a final ensemble with more manageable false alarm rates. It was verified that the maximum jumps occurring in the Key Variables at the Attacker precede the Attack at the Target in all cases, signifying that the present methodology extracted the right events for enabling Proactive Detection. The significance levels on GCT can therefore be used as a tuning parameter for effecting a trade-off between detections and false alarms. Larger significance levels lead to higher thresholds, and vice-versa.

The example embodiment described above provides a specific methodology for automatically extracting probable precursors of DDoS attacks using MIB Traffic Variables. For all three attacks under study, the methodology extracts at least one valid attack precursor, with rates of false alarm of about 1%. Since the framework depends on MIB information alone, it is then straightforward to use these statistical signatures to implement MIB watches in common Network Management Systems. As shown in FIG. 9, the Key Variables at the Attacker display peak preceding the Attacks at the Target. Alarms can therefore be set when these peaks are observed in the MIB time series. It was noticed that T2 events at the Attacker usually precede T4 events at the Target by about 50-60 sample intervals (about 5 minutes).

What has been described in the example embodiment is a methodology for utilizing NMSs for the early detection of Distributed Denial of Service Attacks (DDoS). A principled approach is described for discovering precursors to DDoS attacks in databases formed by MIB variables recorded from multiple domains in networked information systems. The approach is rooted in time series quantization, and in the application of the Granger Causality Test of classical statistics for selecting variables that are likely to contain precursors. A methodology is described for discovering Precursor Rules from databases containing time series related to different regimes of a system. These Precursor Rules relate precursor events extracted from input time series with phenomenon events extracted from output time series. Using MIB datasets collected from real experiments involving Distributed Denial of Service Attacks, it is shown that Precursor Rules relating activities at attacking machines with traffic floods at target machines can be extracted by the methodology. The technology has extensive applications for Security Management: it enables security analysts to better understand the evolution of complex computer attacks, it can be used to trigger alarms indicating that an attack is imminent, or it can be used to reduce the false alarm rates of conventional IDSs.

The example embodiment is just one of many possible specific implementations of the attack prediction aspect of the present invention. The precursors of DDoS attacks are discovered in this embodiment with statistics-based machine learning algorithms, where the precursor events are certain values of prior MIB variables. However, as previously discussed, the invention is not limited to statistics-based machine learning algorithms; other algorithms known in the art including, but not limited to, neural networks and AI-based algorithms are also suitable. Therefore, while the above-described example embodiment of the invention utilizes several specific algorithms for discovering precursors of attacks, any suitable algorithm may be used.

In addition, while the example embodiment utilizes values of SNMP MIB variables as the domain of events from which to discover precursor events, protocols other than SNMP may be used. Further, the precursors of DDoS attacks are not limited to values of MIB variables. Other kinds of events may be exploited for use in the present invention including, but not limited to, events that issue from end-station and applications management agents including, but not limited to, log-on traces, keystroke traces, and records of computer processes. Domain-specific agents may also collaborate in order to determine the likelihood of an impending attack. Finally, while the example embodiment specifically applies a distributed denial-of-service attack, the present invention is applicable to other kinds of network attacks.

To implement the methodology of the present invention, rules (i.e. policies) may be implemented in one or more distributed management systems such as, but not limited to Aprisma Management Technologies Spectrum™. In one such implementation, the "If" part of the rule is a MIB variable watch and the "Then" part is an action to send a message to a system that manages the Target domain. The physical implementation of such policies is simple for one of ordinary skill in the art.

In a real setting, multiple network or technology domains are likely to be involved. For example, an attack might commence in Seattle while the target is in Miami. The present invention may also be applied to such multi-domain environments. To do so, at least two issues must be addressed: (i) network management systems in the multiple domains will need to be in communication, and (ii) an "impending attack" alert and offending packets might find themselves racing towards the same domain, where the former's destination is the target and the latter's destination is a management system for the target. Each of these issues may be easily addressed by a myriad of solutions already known in the art. For example, possible solutions to the racing problem include, but are not limited to, sending the alert via phone, pager, or satellite.

Figure 10:
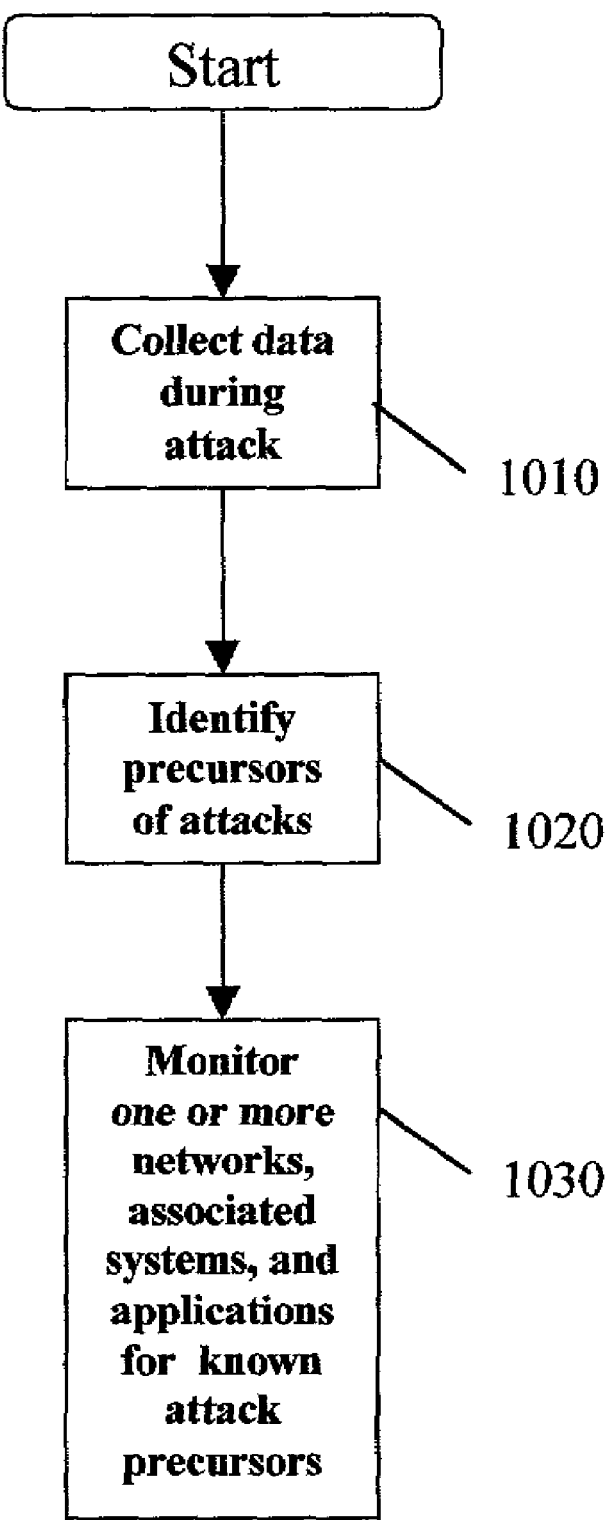
FIG. 10 illustrates the operation of an embodiment of an apparatus for predicting attacks in communications networks according to the present invention.

An illustration of the overall operation of an embodiment of an apparatus for attack prediction according to the present invention is shown in FIG. 10. As shown in FIG. 10, data is collected 1010 from network devices during a real or simulated network attack. The collected data is then analyzed to identify 1020 specific temporal precursors of the attack. In this embodiment, one or more network domains are then monitored 1030 for the presence of the precursors.

Figure 11:
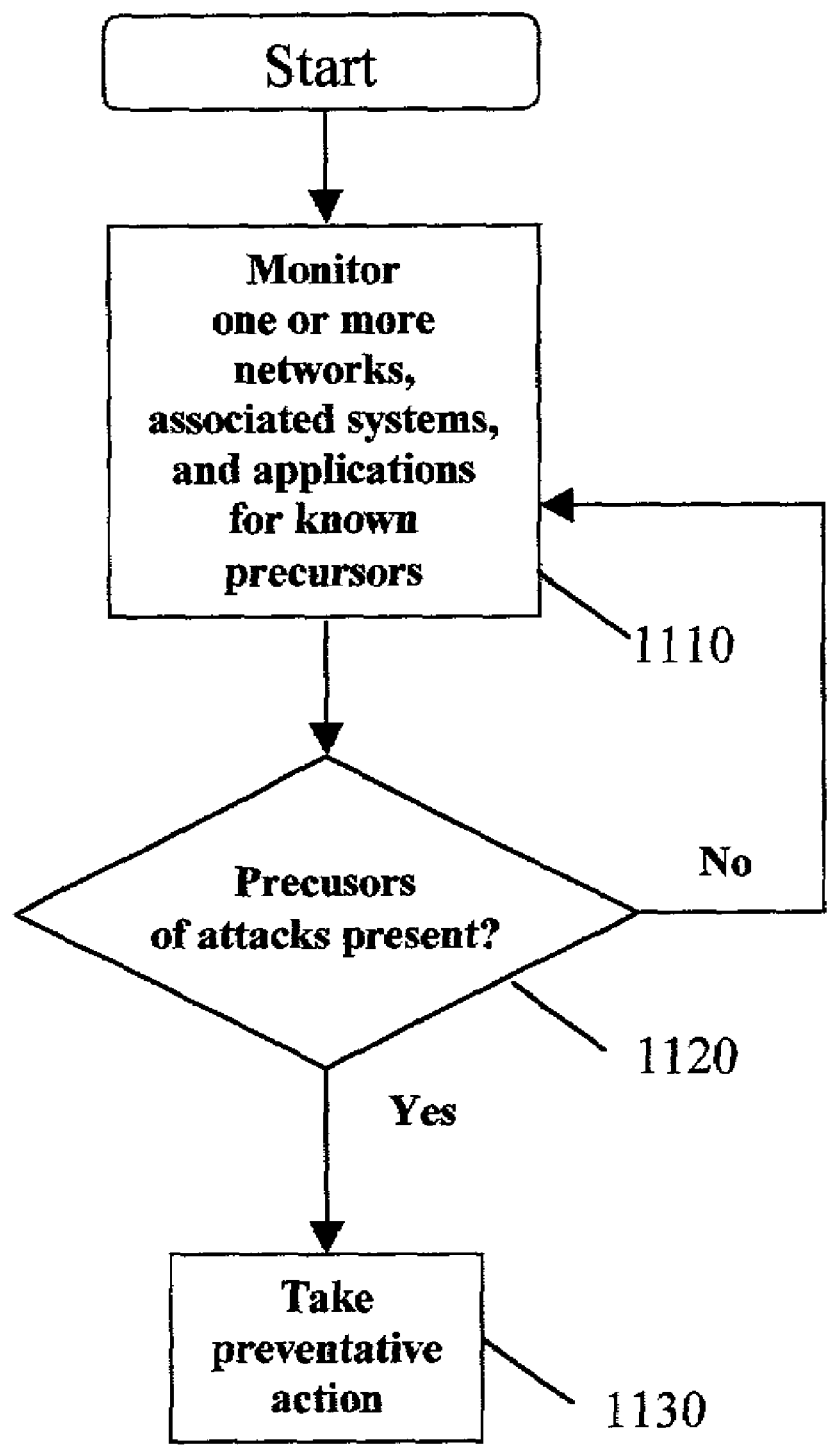
FIG. 11 illustrates the operation of an embodiment of an apparatus for preventing attacks in communications networks according to the present invention.

An illustration of the overall operation of an embodiment of an apparatus for preventing attacks according to the present invention is shown in FIG. 11. As shown in FIG. 11, one or more network domains are monitored 1110 for the presence of one or more known attack precursors. When the presence of a precursor is detected 1120, appropriate protective action is taken 1130.

The invention may optionally utilize one or more network management systems or element management systems to implement any of the steps or perform the functions of any of the devices of FIG. 1, 2, 10, or 11. When utilized, the network management component of the present invention may include one or more systems such as Aprisma Spectrum™, HP OpenView, or any other compatible network management system known in the art. Use of more than one kind of network management system, corresponding to different network technologies, is also possible.

Security Management is both a technical and an administrative consideration in information management. Three possible areas where the Proactive Intrusion Detection aspect of the present invention can be applied in Security Management include active response, computer forensics, and pruning false alarms from passive Intrusion Detectors.

The most obvious utilization of the present invention for Security Management is for triggering an early, or preemptive, active response to a security violation. For example, consider a scenario involving three network clusters, which will each be monitored by three individual Network Management Modules (NMM) installed on machines A1, A2 and A3 in each cluster. Assume that DDoS Slaves are installed in A1 and A2, and the Target is somewhere in Cluster 3. Assume also that Proactive Rules were obtained, relating precursors at A1 and A2 to an Attack against Cluster 3. Assume finally that the Master is somewhere on the Internet, not monitored by the NMMs in the clusters. Following the detection of precursors at A1 and A2, three general classes of Responses are identified:

Class 1: Local Active Response at the Destination. In this scenario, the NMMs in Cluster 1 and Cluster 2-NMM1 and NMM2-inform NMM3 that an Attack against Cluster 3 is imminent. It is assumed that a Virtual Private Network (VPN) is in place that carries messages in a faster and more reliable way than the "raw" Internet used to carry the attack. NM3 takes a series of actions inside Cluster 3, i.e. sending instructions to firewalls, disabling router ports, etc. NMM3 does not try to interact with the other Clusters—this is done in Class 3—but simply protects itself against the incoming attack.

Class 2: Local Active Response at the Source. In this case, NMM1 and NMM2 thwart the attack by shutting down A1 and A2. NMM3 is not even made aware that an Attack from Clusters 1 and 2 was under way. This may be desirable in many cases, taking into account the legal aspects involved in Information Warfare. DDoS Slaves are cloaked inside the hosts; their presence is first detected by the attack precursors. The precursors discovered by the present invention are intrinsic to the attack and were found automatically, out of a relatively large universe of possibilities, by the present invention. The hacker cannot avoid leaving these traces and may not even be aware that an NMS can capture the precursors to an attack.

Class 3: Global Active Response. In this scenario, NMM1 and NMM2 inform NMM3 about the imminent attack against Cluster 3. NMM3, relying on a properly designed messaging system and a VPN, severs the connection between Cluster 1, Cluster 2, and the rest of the world. Alternatively, the decision to shut down the exits from Cluster 1 and Cluster 2 might be made in agreement with NMM1 and NMM2. The reason why NMM1 and/or NMM2 might allow such an outcome is that the subnetwork formed by NMM1, NMM2 and NMM3 is in fact a neutral agent in the whole process. NMMi is therefore not in league with Cluster i, but rather is part of an overall defensive system designed to protect the network as a whole (Cluster 1, Cluster 2, and Cluster 3). The practical and technical hurdles involved in setting up such an infrastructure have been, of course, a subject of research. For example, coordination among different agents for responding to a DDoS attack has been investigated in D. Schnackenberg, K. Djahandari and D. Sterne, "Infrastructure for intrusion detection and response," *Proceedings of DARPA Information Survivability Conference and Exposition*, Hilton Head Island, S.C., January 2000.

Another area of application for the present invention is for computer forensics. Computer Forensics is an emerging discipline lying at the intersection of Information Assurance Systems and Law Enforcement. Computer Forensics starts with the fact of abuse having occurred and attempts to gather the evidence needed by the investigators to identify the culprits and allow their prosecution. The Detection Rules and Interpretation Rules extracted via the present invention can be used in Forensic Computing. These rules can be understood as "statistical signatures" of the Security Violations; if these signatures are encountered on-line, they will trigger the Detection Rules. If they are encountered off-line, they can be used as evidence that the Security Violation took place.

A further area of application for the present invention is for pruning false alarms from passive Intrusion Detectors. Current passive IDSs are plagued by high rates of false alarm, explainable in part by the base rate fallacy of classical statistics and the rarity of attacks in comparison to normal activity. The presence (or, rather, the absence) of reliable precursors may be used to prune false alarms from passive IDSs. Intuitively, an alarm raised by a passive IDS that is preceded by an identified precursor should be given more weight than an alarm that is not preceded by a precursor. This is a typical situation where the NMS can be seen as a repository of valuable information about the environment surrounding an IDS. Current IDS research is moving towards the development of cost-sensitive schemes, balancing accuracy, resource utilization, and the damage cost of intrusions. In a probabilistic sense, the precursor enables the NMS to update the IDS regarding the prior probability of a given Security Violation.

The apparatus and method of the present invention, therefore, provide protection for data, voice, and video networks by allowing identification of temporal precursors of attacks, monitoring future network activity for such precursors, and taking action when attack precursors are detected, where the protected domain potentially includes multiple, interconnected network technologies. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications and substitutions by one of ordinary skill in the art are therefore also considered to be within the scope of the present invention, which is not to be limited except by the claims that follow.

What is claimed is:

1. A system for security management in a data, voice, or video network, comprising:
    a data collector coupled to the network and configured to collect one or more datasets from the network, wherein the collected datasets include at least one dataset collected from the network during a real or simulated attack on the network, and wherein the collected datasets further include at least one dataset collected from the network during an attack-free time period;
    a temporal correlation engine communicatively coupled to the data collector, wherein temporal correlation engine is configured to:
        identify one or more variables at a target of the real or simulated attack on the network, wherein the variables identified at the target characterize the real or simulated attack on the network;
        identify one or more key variables among the variables that characterize the real or simulated attack on the network, wherein the key variables are identified as containing precursors of the real or simulated attack on the network;
        use the dataset collected during the attack-free time period to construct one or more normal profiles for the network;
        extract a time series of precursor events that occurred prior to the real or simulated attack on the network from the dataset collected during the real or simulated attack on the network, wherein extracting the time series of precursor events includes comparing a time series evolution for the key variables during the real or simulated attack with the normal profiles constructed from the dataset collected during the attack-free time period;
        extract at least one temporal rule for a scenario associated with the real or simulated attack on the network, wherein the temporal rule includes the extracted time series of precursor events; and
        verify that the extracted time series of precursor events consistently occurred in the network prior to the real or simulated attack on the network; and
    a network management system executing on at least one device coupled to the network, wherein the network management system is configured to:
        monitor subsequent activity in the network to detect an occurrence of one or more of the precursor events in the monitored network activity; and
        take protective action to prevent an imminent attack on the network in response to detecting one or more of the precursor events in the monitored network activity, wherein the temporal rule defines the protective action to be taken.

2. The system of claim 1, wherein the datasets collected from the network include Management Information Base (MIB) variables collected using Simple Network Management Protocol (SNMP).

3. The system of claim 1, wherein identifying the variables that characterize the real or simulated attack on the network includes using domain knowledge about the real or simulated attack.

4. The system of claim 1, wherein identifying the variables that characterize the real or simulated attack on the network includes comparing a time series evolution for each variable collected during the real or simulated attack to the normal profiles constructed from the dataset collected during the attack-free time period.

5. The system of claim 4, wherein a variable having a time series evolution that statistically varies from the normal profiles is identified as characterizing the real or simulated attack on the network.

6. The system of claim 1, wherein identifying the key variables that contain the precursors of the real or simulated attack further includes using the Granger Causality Test (GCT) to measure relative causality strengths between a plurality of candidate key variables and the variables that characterize the real or simulated attack on the network.

7. The system of claim 1, wherein the extracted temporal rule further includes a statistical signature of behavior likely to occur prior to an attack on the network.

8. A method for security management in a data, voice, or video network, comprising:

collecting one or more datasets from the network using a data collector coupled to the network, wherein the collected datasets include at least one dataset collected from the network during a real or simulated attack on the network, and wherein the collected datasets further include at least one dataset collected from the network during an attack-free time period;

identifying one or more variables at a target of the real or simulated attack on the network using a temporal correlation engine communicatively coupled to the data collector, wherein the variables identified at the target characterize the real or simulated attack on the network;

identifying one or more key variables among the variables that characterize the real or simulated attack on the network using the temporal correlation engine, wherein the key variables are identified as containing precursors of the real or simulated attack on the network;

using the dataset collected during the attack-free time period to construct one or more normal profiles for the network, wherein the one or more normal profiles are constructed using the temporal correlation engine;

extracting a time series of precursor events that occurred prior to the real or simulated attack on the network from the dataset collected during the real or simulated attack on the network, wherein extracting the precursor events includes the temporal correlation engine comparing a time series evolution for the key variables during the real or simulated attack with the normal profiles constructed from the dataset collected during the attack-free time period;

extracting at least one temporal rule for a scenario associated with the real or simulated attack on the network using the temporal correlation engine, wherein the temporal rule includes the extracted time series of precursor events;

verifying that the extracted time series of precursor events consistently occurred in the network prior to the real or simulated attack on the network using the temporal correlation engine;

monitoring subsequent activity in the network to detect an occurrence of one or more of the precursor events in the monitored network activity, wherein a network management system executing on at least one device coupled to the network is configured to monitor the subsequent activity in the network; and taking protective action to prevent an imminent attack on the network in response to the network management system detecting one or more of the precursor events in the monitored network activity, wherein the temporal rule defines the protective action to be taken.

9. The method of claim 8, wherein the datasets collected from the network include Management Information Base (MIB) variables collected using Simple Network Management Protocol (SNMP).

10. The method of claim 8, wherein identifying the variables that characterize the real or simulated attack on the network includes using domain knowledge about the real or simulated attack.

11. The method of claim 8, wherein identifying the variables that characterize the real or simulated attack on the network includes comparing a time series evolution for each variable collected during the real or simulated attack to the normal profiles constructed from the dataset collected during the attack-free time period.

12. The method of claim 11, wherein a variable having a time series evolution that statistically varies from the normal profiles is identified as characterizing the real or simulated attack on the network.

13. The method of claim 8, wherein identifying the key variables that contain the precursors of the real or simulated attack further includes using the Granger Causality Test (GCT) to measure relative causality strengths between a plurality of candidate key variables and the variables that characterize the real or simulated attack on the network.

14. The method of claim 8, wherein the extracted temporal rule further includes statistical signatures of behavior likely to occur prior to an attack on the network.

* * * * *

UNITED STATES PATENT AND TRADEMARK OFFICE
CERTIFICATE OF CORRECTION

PATENT NO. : 7,603,709 B2  Page 1 of 1
APPLICATION NO. : 10/138836
DATED : October 13, 2009
INVENTOR(S) : Lewis et al.

It is certified that error appears in the above-identified patent and that said Letters Patent is hereby corrected as shown below:

On the title page:

Please add:

Related U.S. Application Data should read

Item (60) Provisional application No. 60/288,530, filed on May 3, 2001.

Signed and Sealed this

Sixteenth Day of March, 2010

David J. Kappos
*Director of the United States Patent and Trademark Office*